US008425031B2

(12) United States Patent
Ohshima et al.

(10) Patent No.: US 8,425,031 B2

(45) **Date of Patent: *Apr. 23, 2013**

(54) INKJET MEDIUM, INK AND INKJET RECORDING METHOD

(75) Inventors: Tohru Ohshima, Atsugi (JP); Kiyofumi Nagai, Machida (JP); Yuuji Kojima, Mizuho (JP); Yasuharu Onogi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 12/671,484

(22) PCT Filed: Aug. 29, 2008

(86) PCT No.: PCT/JP2008/066020

§ 371 (c)(1), (2), (4) Date: Jan. 29, 2010

(87) PCT Pub. No.: WO2009/028733

PCT Pub. Date: Mar. 5, 2009

(65) Prior Publication Data

US 2010/0196603 A1 Aug. 5, 2010

(30) Foreign Application Priority Data

Aug. 30, 2007 (JP) ................................ 2007-223567

(51) Int. Cl.

*B41J 2/01* (2006.01)

*G01D 11/00* (2006.01)

(52) U.S. Cl.

USPC ............................ 347/105; 347/101; 347/100

(58) Field of Classification Search .................. 347/100, 347/102, 105, 101, 95, 96; 106/31.6, 31.27, 106/31.13; 523/160, 161; 428/195, 32.1

See application file for complete search history.

(56) References Cited

U.S. PATENT DOCUMENTS

| | | | | |
|---|---|---|---|---|
| 5,997,136 | A * | 12/1999 | Fujisawa et al. | 347/96 |
| 2001/0012556 | A1* | 8/2001 | Kondo et al. | 428/195 |
| 2001/0036552 | A1* | 11/2001 | Otani et al. | 428/411.1 |
| 2003/0227531 | A1* | 12/2003 | Hosoi et al. | 347/105 |
| 2005/0107254 | A1* | 5/2005 | Ogino et al. | 503/200 |
| 2006/0100338 | A1* | 5/2006 | Andersson et al. | 524/442 |
| 2006/0168811 | A1* | 8/2006 | Ozawa et al. | 29/890.1 |

(Continued)

FOREIGN PATENT DOCUMENTS

| | | |
|---|---|---|
| EP | 1 104 703 A1 | 6/2001 |
| JP | 9 143900 | 6/1997 |

(Continued)

OTHER PUBLICATIONS

Extended Search Report issued Feb. 22, 2012 in European Patent Application No. 08828761.0-2304.

*Primary Examiner* — Manish S Shah

(74) *Attorney, Agent, or Firm* — Oblon, Spivak, McClelland, Maier & Neustadt, L.L.P.

(57) ABSTRACT

An inkjet medium having a support mainly containing a cellulose pulp, and a coat layer containing a pigment and an adhesive, the coat layer formed on at least one surface of the support, wherein the pigment in the coat layer as an outermost layer contains at least light calcium carbonate, kaolin and gel type silica, and has an average oil absorption of 70 ml/100 g to 120 ml/100 g.

13 Claims, 15 Drawing Sheets

U.S. PATENT DOCUMENTS

| | | | | |
|---|---|---|---|---|
| 2007/0128349 | A1* | 6/2007 | Miyachi | 427/152 |
| 2007/0197685 | A1 | 8/2007 | Aruga et al. | |
| 2010/0209611 | A1* | 8/2010 | Ohshima et al. | 428/32.11 |

FOREIGN PATENT DOCUMENTS

| | | |
|---|---|---|
| JP | 11 78225 | 3/1999 |
| JP | 2000 141879 | 5/2000 |
| JP | 3074743 | 6/2000 |
| JP | 3349803 | 9/2002 |
| JP | 2003 80837 | 3/2003 |
| JP | 2003 251926 | 9/2003 |
| JP | 2003 253595 | 9/2003 |
| JP | 2003 285543 | 10/2003 |
| JP | 2004 291520 | 10/2004 |
| JP | 2005 96167 | 4/2005 |
| JP | 2005 186359 | 7/2005 |
| JP | 2005 212327 | 8/2005 |
| JP | 2005 256237 | 9/2005 |
| JP | 2005 288696 | 10/2005 |
| JP | 2005 290579 | 10/2005 |
| JP | 3770745 | 2/2006 |
| JP | 2006 218697 | 8/2006 |
| JP | 2006 231914 | 9/2006 |
| JP | 2006 240017 | 9/2006 |
| JP | 2006 240270 | 9/2006 |
| JP | 2006 256001 | 9/2006 |
| JP | 2006 321978 | 11/2006 |
| JP | 2006 347023 | 12/2006 |
| JP | 2007 45044 | 2/2007 |
| JP | 2007 45112 | 2/2007 |
| JP | 2007 62024 | 3/2007 |
| JP | 2007 130906 | 5/2007 |
| JP | 2007 144975 | 6/2007 |
| JP | 2007 216664 | 8/2007 |
| JP | 2008 69327 | 3/2008 |
| JP | 2008 69332 | 3/2008 |
| JP | 2008 137369 | 6/2008 |

* cited by examiner

TOTAL AMOUNT REGULATION ALGORITHM (DURING FOUR-COLOR (CMYK) OUTPUT)

INKJET MEDIUM, INK AND INKJET RECORDING METHOD

This application is a 371 of PCT/JP2008/066020 filed Aug. 29, 2008.

TECHNICAL FIELD

The present invention relates to an inkjet medium, an ink and an inkjet recording method enable to obtain a high quality image and texture close to those obtained by commercial printing such as offset printing by means of inkjet system at low cost, particularly, a recording medium enables to obtain high image gloss without performing post treatment in spite of its matte texture.

BACKGROUND ART

As both of inkjet ink and media have been developed, a high quality image comparative to photographic image quality is achieved by inkjet recording. Particularly, as disclosed in Patent Literatures 1 and 2, an inkjet recording method in which an aqueous ink and porous medium are used becomes popular in terms of its convenience and safety, so that the conventional silver halide method is being replaced with the inkjet recording method in the field of photography.

On the other hand, an aqueous inkjet recording method has become used for inkjet coated paper as well as for plain paper or inkjet matte paper in a commercial printing field. However, in a commercial printing field where a printing cost, speed, and image quality are severely demanded, the aqueous inkjet recording method is limited to use in certain fields such as proof or page wide printing. A method of providing image quality comparable to commercial printing on coated paper (commercial coated paper), which is used for general offset printing or gravure printing, at adequately high speed by the aqueous inkjet recording, has not been achieved yet. When the inkjet printing is performed on common coated paper for commercial printing, ink absorption and wettability are poor, causing many problems, for example, image bleeding and dry failure. Therefore, currently the aqueous inkjet recording method cannot be practically used in the commercial printing field.

Conventionally, to obtain a print having texture of commercial printing paper, such as A2 grade glossy coated paper, A2 grade matte coated paper and art paper by the aqueous inkjet recording, each of these paper sheets is used as a base and a transparent inkjet receiving layer as a surface layer is formed over the base. This technique is practically used in applications such as proof as mentioned above. However, the production cost of the media is extremely high than that of the common printing paper, and eventually, the printing cost thereof is also extremely high. Therefore, it is not at all practical to apply the technique to leaflets distribution and the like.

Moreover, there is another method in which a material having relatively large oil absorption, such as colloidal silica, alumina hydrate or the like, is applied on a base paper so as to have sufficient ink absorption, and calcium carbonate or other pigments are used together, thereby forming a coat layer having texture similar to that of printing paper. In this method, because raw materials such as colloidal silica, alumina hydrate and the like are also expensive, the cost of the media tends to be high at any price. Therefore, the application of this method is currently limited only to proof or the like. It is difficult to apply the method to commercial printing such as leaflets, catalogs and the like, in which priority is given to printing cost.

Particularly, by using silica, alumina hydrate or the like, a medium which has a coat layer having texture similar to that of printing paper easily causes peculiar problems. Namely, in the case of this type of media, in order to obtain high quality image by inkjet printing, a large amount of ink needs to be absorbed in the media similar to standard inkjet paper. Thus, it is necessary to ensure ink absorption by adding a large amount of pigment having relatively large oil absorption in the coat layer. When the large amount of pigment having large oil absorption is contained in the coat layer, ink absorption is improved, but the coat layer is easily embrittled (powder fall). The embrittlement is prevented by increasing the blending ratio of binder, but this inhibits ink absorption, and the object cannot be achieved. One technical point of improving this type of media is how these problems are resolved, as disclosed in Patent Literature 3. However, the media tend to be inferior to the commercial printing paper. Moreover, when this kind of media are applied to the commercial printing field, it is essential to obtain stable processability even when a large number of media is cut all together. The media easily cause powder fall, particularly, media such as conventional inkjet coated paper, which need to be trimmed (cut twice), cannot be used, because they may cause trouble in quality in the commercial printing field in which cut and fold are essential in processing media. Particularly, the media which need additional processing steps in contrast to the conventional printing paper, and cautious handling, cannot be used in the commercial printing field in which priority is given to processing cost, in terms of productivity.

As to these porous media, oil absorption of pigment in the coat layer has been tried to be optimized many times in order to prevent powder fall and achieve suitable gloss and image quality.

For example, Patent Literature 4 discloses cast coated paper for inkjet recording having an ink receiving layer which contains a pigment, binder and cation resin, wherein the pigment has an oil absorption of 210 ml/100 g to 330 ml/100 g, and as the binder 30 mass % to 70 mass % of polyvinyl alcohol is used relative to the pigment. Patent Literature 4 also discloses that when the oil absorption is less than 210 ml/100 g, the ink absorption is decreased, and on the other hand, when the oil absorption is more than 330 ml/100 g, the pigment absorbs the binder and the strength of the coated film is decreased. This medium has a gloss layer formed on the ink receiving layer and is treated at high cost using a cast drum so as to exhibit white paper gloss. It is extremely difficult to take a balance among ink absorption, white paper gloss and strength of the coat layer. Particularly, an inkjet media taking the balance thereof at low cost has not been achieved.

Meanwhile, when coated paper for commercial printing is subjected to typical offset-printing, matte-type paper as well as gloss-type paper can obtain relatively high image gloss. On the other hand, an inkjet medium using dye ink generally obtains gloss in an image part which is equal to that of a background part. Recently-commercialized aqueous pigment inks tend to provide lower gloss in the image part than in the background part for inkjet media. This difference in the level of gloss between the image part and background part makes the appearance of the print look strange unlike familiar commercial prints, which is a reason that the inkjet system is not used frequently for commercial printing. Additionally, in the commercial printing field, prints are sometimes get wet or used in a bare condition, and demanded to have image reliability which is much higher than that of applications for photography in which prints are stored in albums or in picture frames. In terms of this point, the aqueous dye ink is not easily used, and the aqueous pigment ink is normally preferred. In order to improve the aqueous pigment ink and image gloss, various techniques of media and recording methods for photography have been developed. However, there has not been a dominant technique for improving image gloss, which can provide high productivity (high-speed printability) and can be used in commercial printing application.

There are a great number of types of common coated paper for commercial printing having different texture, particularly the paper having different background gloss, and users can use any paper depending on desired purposes. This is because the types of paper have been increased in the whole paper industry to meet the complicated and severe requirements in texture of paper, particularly, the requirements for the background gloss and image gloss of paper by designers of publishers, in the case of commercial printing. When the inkjet system is tried to apply in the commercial printing field, a greater number of types of media must be prepared than those in photographic printing.

Moreover, the coated paper for commercial printing have different formulations of the coat layers depending on background gloss. Recently, paper making machines become larger and the amount of paper produced at once also become significantly larger. This influences production cost of paper. That is, improvement of the productivity of device as much as possible is necessary to decrease cost. In the case of common commercial printing paper, because the amount to be consumed by users are sufficiently large, it is costly advantageous that the productivity of the device is improved even by changing formulations according to each type of paper sheets. Paper sheets are easily produced into the matte and gloss type by changing the proportion of the pigment, and its production stability is high. As a result, a method of changing formulations according to qualities is preferably used.

On the other hand, as to current status of inkjet recording media, although the inkjet recording system has been popular, its market size is very smaller than that of commercial printing paper. Practically, inkjet paper is produced at a relatively low coating-speed using an off-machine coater as a coater specialized for inkjet paper in which production cost tends to be high. Generally, the first condition for producing inexpensive media is to produce the media by a large scale paper machine at high coating speed. However, in light of production of paper using these production equipment at low cost, because the amount of media demanded by user is much smaller than the amount of paper produced at a time, the amount of production is likely to be inappropriate to the productivity of the production device, or huge amount of media which does not correspond to demanded amount is produced at a time. Therefore, the cost of raw materials of the inkjet paper tends to be higher than that of coated paper for commercial printing, and in view of the current situation of the inkjet paper, it is difficult to change formulations according to types of media so as to provide various levels of background gloss. If the formulations of the inkjet paper are changed, the production efficiency is largely decreased and the production cost becomes still higher. Thus, it becomes more difficult to supply inexpensive media.

In the case of the coated paper for commercial printing, as a method in which background gloss is easily changed without changing the formulation of coat layer, the gloss is controlled in a calendering step after coating the coat layer. It may be considered that the method is also applied to the inkjet media. However, generally, inkjet gloss paper is designed to have background gloss without performing the calendaring step, while inkjet matte paper does not exhibit gloss even by calendaring and additionally does not exhibit image gloss similar to that of commercial printing.

There is another problem that when commercial porous inkjet media of either the gloss type or matte type are subjected to calender treatment, pores for absorbing ink, which have been formed by ingeniously adjusting the formulation of an ink absorption layer, become smaller in proportion to the strength of the calender treatment, and the ink absorption ability of the ink absorption layer is significantly decreased, and compatibility is changed from it before treatment. Therefore, when printing is performed under an optimized printing condition on media which have not been subjected to calender treatment, generally, image quality is also significantly decreased. Even if it is printable, different image treatment (printing condition setting) is needed. In the case of the inkjet recording, generally the image treatment is changed according to the ink absorption ability of media. Thus the number of print modes in a printer becomes vast, and it is not practical at all.

Many conventionally known techniques disclose that the oil absorption of the pigment is defined in conventional inkjet media. These objects are different from an object of the present invention, and points of views and defined ranges are different from those of the present invention. Typical examples are shown below.

Patent Literature 5 discloses an inkjet recording medium having two or more coat layers formed on a support, wherein a first coat layer, which is close to the support, contains a pigment A having a BET specific surface area of less than 100 $m^2/g$ and a pigment B having a BET specific surface area of 100 $m^2/g$ or more, the ratio of the amount of the pigment A to that of the pigment B is 9/1 to 1/9, and a second coat layer, which is far from the support, contains superfine particles selected from silica having an average particle diameter of 0.7 μm or less, alumina and alumina hydrate, and water soluble resin. This inkjet recording medium is to attain a photographic medium or medium for printing proof, by cast method, and has the outermost layer for receiving ink which needs to contain superfine particles having a particle diameter of 0.7 μm or less, thereby being very expensive medium. Additionally, Patent Literature 5 seeks for function in the undercoat layer, and obviously, background gloss and image gloss cannot be obtained as the outermost layer.

Patent Literature 6 discloses an inkjet recording paper having an ink receiving layer formed to be the coated amount of 2 $g/m^2$ to 10 $g/m^2$, wherein the ink receiving layer contains a pigment which is synthetic amorphous silica having an oil absorption of 150 ml/100 g to 250 ml/100 g. This paper is aimed at a non-aqueous pigment ink. An aqueous ink is not suitable for this inkjet recording paper, thereby obtaining poor image quality.

Patent Literature 7 discloses an inkjet recording medium containing at least one ink receiving layer formed on a support, wherein the ink receiving layer mainly contains a pigment and hydrophilic binder, and the pigment has an oil absorption of 100 ml/100 g to 350 ml/100 g, and further contains 20 parts by mass or less of a calcium phosphate compound per 100 parts by mass of the pigment, and the calcium phosphate compound has a solubility in water at 30° C. of 3 g/100 g or less. This inkjet recording medium is excellent in ink absorption and color developing property of image using any of a dye ink and pigment ink. However, this system is related to an inkjet matte paper, thus background gloss and image gloss cannot be obtained.

Patent Literature 8 discloses an inkjet recording paper having an ink receiving cover layer formed on a surface of paper which mainly contains cellulose pulp, wherein the ink receiving cover layer mainly contains 50 wt % to 90 wt % of a pigment having an oil absorption (JIS K 5101) of 50 ml/100 g or more and 10 wt % to 50 wt % of a water soluble adhesive containing 3 wt % to 30 wt % of a modified starch in the solid content of total water soluble adhesive, and the water soluble adhesive contains a water-soluble polymer which is at least one selected from polyvinyl alcohol, modified polyvinyl alcohol and casein, and modified starch. According to Patent Literature 8, the uniformity of coating and uniformity of ink absorption can be significantly improved, but the water soluble adhesive must be used, and the proportion of the total amount of pigment cannot be 90 wt % or more due to powder fall. Thus, the coating solution has high viscosity, and it is disadvantageous to coating at high speed.

In addition to the above description, in the media that is made inkjet suitable, a cationic additive or a sizing agent is used to improve the fixing ability of the colorants and dyes and the pH of the paper surface is brought close to acidic one. Thus, an additive as described in Patent Literature 9 is used, cationic fine particles as described in Patent Literature 10 are used, and the filler surface is treated with a cationic resin, as described in Patent Literature 11. In most cases, an acidic dye demonstrating anionic properties is used for dye inkjet inks. Because the fixing ability of a dye can be increased by bonding a sulfonic group or the like of an acidic dye with a cationic substance contained in the ink, such technology is presently widely used. Coloring pigments of pigment inkjet inks are also often anionic, and the fixing ability can be improved by the same mechanism. For these reasons, in the case of inkjet paper, a treatment that decreases the pH of paper surface (shifts it to acidic side) to ensure excellent preservation of inkjet image is actively conducted, and practically all media designed for inkjet applications has a paper surface pH of 7 or less.

However, inks for commercial printing such as offset printing often employ an oil with a very high boiling point as a solvent and, by contrast with inkjet inks, the fixation of image after printing is realized by oxidation and polymerization of the solvent. In offset printing, fast fixing by drying (oxidation polymerization reaction) is also desired from the standpoint of operability. For this reason, a drying (polymerization) enhancer called "drier" is often added to the ink. Because the drier forms a precipitate of metal ion components under an acidic atmosphere and becomes ineffective, it is known that drying property is decreased significantly in the case of paper having a low pH of paper surface such as inkjet media. In addition, it is well known that dampening water (H liquid) that is used in offset printing sometimes react with cationic substances of inkjet media, thereby destroying the hydrophilic-hydrophobic balance of the printing plate and easily causing printing defects such as image smear. It is also for such technological reasons, rather than only because of cost factors, that the offset printing technology is very difficult to apply to the inkjet media. Although the media are inkjet specialized media, offset printability is an essential function when they are used for commercial printing, thus the offset printability is necessary to be improved.

For the above reasons, in order to apply the inkjet recording system to the commercial printing field, many technical improvements are necessary, such as a technique of producing media having various texture and gloss at low cost, a technique of making compatibility closer to each of various types of media, a technique of attaining image gloss in a matte texture at low cost, improvement of post-treatment properties such as prevention of powder fall, offset printability, and the like.

The inventors of the present invention have studied an inkjet recording method which enables to obtain texture close to the commercial printing at low cost, for the purpose of applying the inkjet recording method using an aqueous pigment in the commercial printing field.

In order to resolve the above-mentioned problems, Patent Literature 12 suggests a low-cost method for recording images on commercial-grade paper by combining a pigment ink with high penetration ability and a recording medium that, by contrast with the conventional media, has low ink absorption ability. With this method, only a solvent (water or an organic solvent) forming the ink is selectively caused to infiltrate into the substrate by recording using a small amount of pigment ink with ultrahigh penetration ability on a recording medium having provided thereon a coat layer for inhibiting ink absorption (penetration) so that the pigment contained in the ink does not infiltrate intensively into the medium, and the colorant (pigment) contained in the ink can be caused to remain on the medium surface with good efficiency, without using any special material such as cation fixing agent. As a result, both a sufficient density and drying ability can be realized with a small amount of ink. Moreover, because the colorant contained in the ink is caused to remain effectively on the medium surface, high transparency of the layer that was a necessary function in the conventional recording media becomes unnecessary. Therefore, the degree of freedom relating to material configuration of the coat layer can be greatly increased. By applying this method, it is possible to perform inkjet recording even on paper with low ink absorption ability such as commercial printing paper or publication printing paper. However, with this method, it has been difficult to print image quality as high as that of conventional offset printing directly on commercial printing paper at a commercially practical speed. Because these paper sheets have poor drying property, set-off occurs by stacking the paper immediately after printed at high speed and output. Therefore, there are abundantly many restrictions in use of those paper sheets when they are used for business purpose, such as printing business.

Patent Literature 1: Japanese Patent Application Laid-Open (JP-A) No. 2005-212327
Patent Literature 2: JP-A No. 11-078225
Patent Literature 3: JP-A No. 2005-288696
Patent Literature 4: JP-A No. 2006-240017
Patent Literature 5: JP-A No. 2006-231914
Patent Literature 6: JP-A No. 2006-240270
Patent Literature 7: JP-A No. 2006-218697
Patent Literature 8: Japanese Patent (JP-B) No. 3074743
Patent Literature 9: JP-B No. 3349803
Patent Literature 10: JP-A No. 2003-080837
Patent Literature 11: JP-A No. 2006-321978
Patent Literature 12: JP-A No. 2007-144975

DISCLOSURE OF INVENTION

In view of above mentioned achievement, the present invention is made to solve the problems.

That is, an object of the present invention is to provide an inkjet recording method which enables to easily print a print having high quality image, handling ability comparable to that of an general inkjet media and texture close to that of a commercial print, at high speed at low cost, particularly as in offset printing system, and enables to obtain high image gloss on a medium having matte texture by use of an inkjet media and ink of the present invention. Another object of the present invention is to provide a medium which can be subjected to calender treatment, which is not usually performed for inkjet media, wherein background gloss of the medium can be controlled to matte type or gloss type by controlling the degree of calender treatment, and inkjet printability is not largely changed even by changing the condition of the calendar treatment. Moreover, an inkjet medium for aqueous pigment ink can be used as commercial printing paper by having offset printability, and an aqueous pigment ink which is optimized for the medium and an inkjet recording system.

Means for solving the above-described problems are described below:

<1> An inkjet medium containing a support mainly containing a cellulose pulp, and a coat layer containing a pigment and an adhesive, the coat layer formed on at least one surface of the support, wherein the pigment in the coat layer as an outermost layer contains at least light calcium carbonate, kaolin and gel type silica, and has an average oil absorption of 70 ml/100 g to 120 ml/100 g.

<2> The inkjet medium according to <1>, wherein the amount of the gel type silica in the coat layer as the outermost layer relative to the total pigment amount in the coat layer as the outermost layer is 15 mass % or less, and the adhesive contains at least SBR latex and any one of starch and cationized starch.

<3> The inkjet medium according to any one of <1> and <2>, wherein the amount of a cationic resin in the coat layer as the outermost layer is 2 mass % or less.

<4> The inkjet medium according to <1>, wherein the coat layer is subjected to calender treatment so as to have a background gloss of 5% to 75% based on 75-degree specular glossiness measured in accordance with JIS P8142.

<5> An ink containing colorant particles, glycerin, a water soluble organic solvent, water, a surfactant, and a resin emulsion, wherein the ink has an surface tension of 15 mN/m to 30 mN/m, and the ink is used for the inkjet medium according to <1>.

<6> The ink according to <5>, wherein the ink contains a self dispersible pigment as the colorant, and the self-dispersible pigment has an average particle diameter of 0.01 μm to 0.16 μm.

<7> An inkjet recording method including printing an image on the inkjet medium according to any one of <1> to <4> using the ink according to <5>, wherein the maximum amount of ink adhesion is 20 $g/m^2$ or less.

<8> The inkjet recording method according to <7>, including jetting an inkjet ink from an inkjetting unit so as to form an image on the inkjet medium by applying a stimulus.

<9> The inkjet recording method according to <8>, wherein the stimulus is at least one selected from heat, pressure, vibration and light.

According to the present invention, a high quality image can be provided at low cost and high speed and with high image reliability by using a recording method of the present invention, when inkjet recording is performed.

BEST MODE FOR CARRYING OUT THE INVENTION

Figure 1:
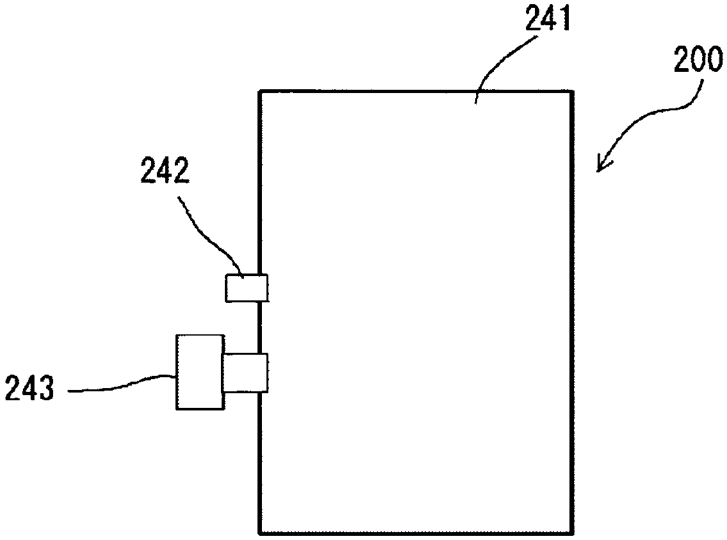
FIG. 1 shows a schematic view of an example of an ink cartridge used in the present invention.

Hereinafter, an inkjet recording medium of the present invention will be explained in detail.

To achieve an inkjet recording method which provides high image reliability and high post-treatment properties at low cost and high speed, formulations of media and ink, and their compatibility have been studied so as to attain image quality of commercial printing not by modifying the formulation of a coat layer in conventional inkjet specialized coated paper, but by using a medium containing novel formulation specialized in an aqueous pigment ink and aqueous pigment ink having ultrahigh penetration ability. Moreover, it is also aimed to attain a medium applicable to various levels of background gloss as is common commercial printing paper by changing the conditions of calender treatment after coating a coat layer whose formulation is not changed.

Namely, an object of the present invention is to develop a formulation of a medium so as to increase media having a variety of background gloss only by means of the calender treatment after coating step.

Specifically, according to the studies by the inventors of the present invention, it is possible to attain a medium on which high image quality can be printed at high speed and low cost by specifically limiting the kinds of pigments constituting a coat layer of the medium and controlling the oil absorption of the entire coat layer within a certain range, and whose background gloss can be controlled only by the condition of calender treatment, which less influences compatibility. Moreover, the medium has texture much close to that of commercial print and exhibits high image gloss when printing on the medium having matte texture.

<Coat Layer>

According to the present invention, the coat layer contains a pigment and binder, and further contains a surfactant and other components. The addition of at least light calcium carbonate, kaolin and gel type silica together as a pigment in the coat layer allows to obtain a medium in which a certain ink absorption is secured while keeping a texture close to that of printing paper, the background gloss can be controlled by the degree of the condition of calender treatment, and the ink absorption is not largely changed by the degree of, or with or without performing the calender treatment.

At first, the kaolin, which is one of the essential components, is necessary to increase the background gloss when the medium is subjected to calender treatment. It is difficult to control the background gloss in a calendering step, when the kaolin is not contained in the coat layer. Examples of the kaolins include delaminated kaolin, calcinated kaolin and hydrokaolin. When the gloss development property is taken into account, it is preferable that kaolin have an average particle diameter of 2 μm or less.

The amount of the kaolin is preferably 60 parts by mass or more in 100 parts by mass of a total amount of pigment in the coat layer. When the amount is less than 60 parts by mass, there may be a failure in obtaining a sufficient gloss. The maximum amount of the kaolin is not particularly limited, but it is preferably 80 parts by mass or less in terms of coating suitability, with consideration given to the fluidity of kaolin and thickening property under a high sheering force in particular.

Next, the light calcium carbonate, which is one of the essential components, controls whiteness degree and dot diameters after an aqueous pigment ink lands on the medium, and improves wettability with an ink, specifically makes dot larger as is substantially circular. When the light calcium carbonate is not contained in the coat layer, the dot diameters become smaller, and a solid image is hard to be filled in upon printing at high speed, causing banding and decreasing image density. Moreover, when the background gloss is controlled in the calendering step without containing the light calcium carbonate, the dot diameters are easily changed according to ink absorption, and compatibility is significantly decreased.

The light calcium carbonate has an average particle diameter of preferably 3 μm or less, and more preferably 1.5 μm or less, in terms of gloss obtained by calender treatment. The blending ratio of the light calcium carbonate in the total pigment is preferably 20 mass % or more, and more preferably 30 mass % or more.

Finally, the gel type silica, which is one of the essential components, improves drying speed of ink. When the gel type silica is not contained in the coat layer, paper stacking property is significantly decreased. There are many kinds of silicas, such as dry process silica, wet process silica, and others according to processes. Generally silicas are often used to improve ink absorption of inkjet media. In the present invention, it is necessary to use gel type silica. When other silicas, such as dry process silica, are used, the medium does not exhibit gloss by calender treatment even though the pigment has a uniform particle diameter. The gel type silica preferably has an average particle diameter of 5 μm or less, and more preferably 2 μm or less.

As the blending ratio of the gel type silica is larger, the ink absorption is increased. However, the background gloss is decreased by calender treatment, and dot diameters tend to be smaller. When the dot diameters become smaller, banding outstands upon printing at high speed. Moreover, these silicas have strong acidity, and tend to decrease the surface pH of paper. The surface pH of less than 7 outstandingly decreases offset printability, and easily causes dry down that is a phenomenon in which an offset ink penetrates paper during drying process and image density is decreased. Thus, the amount of gel type silica is preferably 15 mass % or less, and more preferably 10 mass % or less in the total amount of the pigment. When a large amount of silica is contained in the coat layer, compatibility may be significantly changed by whether or not the calender treatment is performed. Thus, the amount of gel type silica is preferably 15 mass % or less. On the other hand, when the amount of gel type silica is too small, ink absorption tends to be insufficient. Thus, the amount of gel type silica is preferably 5 mass % or more in total amount of the pigment.

As thus far described, the conditions have been explained in terms of the background gloss of the media. Moreover, in terms of the balance between image gloss after printing and ink absorption, total (average) oil absorption is necessary to be limited so as to decide the blending ratio of the pigment contained in the coat layer. Here, the oil absorption of each pigment is a value measured in accordance with JIS K5101. Total oil absorption is a value obtained by multiplying the oil absorptions per unit of the pigments by respective blending ratios, and then summing them.

As the oil absorption of each pigment, a value measured in accordance with JIS K5101 is used.

The total oil absorption is obtained by multiplying the oil absorption of each pigment by a blending ratio of each pigment and summing them. That is, when an oil absorption of pigment A is A (ml/100 g), an oil absorption of pigment B is B (ml/100 g), and an oil absorption of pigment C is C (ml/100 g), and blending ratio is a:b:c, the total oil absorption is $(A \times a + B \times b + C \times c)/(a+b+c)$.

In order for an image to exhibit gloss after printing in a medium having matte background gloss sufficiently without subjecting a medium to calender treatment, the average oil absorption of these pigments needs to be 120 ml/100 g or less. When the average oil absorption is more than 120 ml/100 g, the image gloss is hard to be exhibited, and texture similar to that of offset printing cannot be obtained.

On the other hand, when the average oil absorption is less than 70 ml/100 g, beading and bleeding outstand in a part of high image density upon printing at high speed, despite using the ink of the present invention. To prevent this, the average oil absorption needs to be 70 ml/100 g or more.

Moreover, other inorganic pigments and organic pigments can be used as necessary, as long as the above conditions are satisfied.

Examples of inorganic pigments include talc, calcium sulfite, titanium white, magnesium carbonate, titanium dioxide, aluminum hydroxide, calcium hydroxide, magnesium hydroxide, zinc hydroxide, and chromite.

Examples of organic pigments include aqueous dispersion of particles such as styrene-acryl copolymer particles, styrene-butadiene copolymer particles, polystyrene particles and polyethylene particles. These organic pigments may be used in combination.

The organic pigments can have a dense solid form, hollow form, or donut-like form. From the standpoint of the balance of gloss developing ability, surface coatability, and flowability of the coating liquid, a hollow pigment preferably having an average particle diameter of 0.2 μm to 3.0 μm, and more preferably having a void ratio of 40% or more is used.

<Materials Constituting Coat Layer: Binder>

The binder of the coat layer used in the present invention is particularly preferably a certain aqueous resin emulsion that has a high adhesion force with the pigment constituting the coat layer and the base paper and causes no blocking. Moreover, the binder of the coat layer particularly preferably matches an ink used for commercial printing paper. In order to avoid piling or tinting which cause troubles in printing, the coat layer particularly preferably contains a styrene-butadiene (SBR) latex which is hardly used for inkjet paper, in addition to starch or modified starch used in paper for general commercial printing. Generally, when the SBR latex is added in an inkjet medium, the surface of the medium becomes hydrophobic, decreasing wettability of inkjet ink. The SBR latex is not compatible with a cation agent as a fixing agent for inkjet ink. Therefore, conventionally, the SBR latex is hardly used for the inkjet paper. However, it is particularly preferably used for enhancing offset printability.

The styrene-butadiene latex may be a copolymer latex that is generally used for coating on paper, such latex being obtained by copolymerization of styrene and butadiene as monomers and, if necessary, other monomers, or by modifying a copolymer by a chemical reaction. Examples of suitable other monomers include acrylic acid, methacrylic acid, and alkyl esters of acrylic acid or methacrylic acid, acrylonitrile, maleic acid, phthalic acid, and vinyl monomers such as vinyl acetate. Crosslinking agents such as methylolated melamine, methylolated urea, methylolated hydroxypropylene urea, and isocyanates may be also contained, and compositions having self-crosslinking ability that are copolymers containing units such as N-methylol acrylamide may be also used. These may be used alone or in combination.

The styrene-butadiene latex is not particularly limited, and other aqueous binders may be used in combination as long as these resins are contained therein.

Examples of starches include an oxidized starch, esterified starch, ferment-modified starch, and cationized starch.

Examples of suitable aqueous binders include fibrous derivatives such as casein, soybean proteins, carboxymethyl cellulose, hydroxyethyl cellulose; styrene-acryl resins, isobutylene-maleic anhydride resins, acrylic emulsions, vinyl acetate emulsions, vinylidene chloride emulsions, polyester emulsions and acryl nitride butadiene latex.

The amount of the aqueous binder in the coat layer used in the present invention is preferably 5 mass % to 30 mass %, more preferably 10 mass % to 20 mass % of the total solid content of the coat layer. When the amount of the aqueous binder is below these ranges, the adhesion force is insufficient, and thus the strength of the ink receiving layer and internal bonding strength may be decreased to cause powder fall.

Other components can be added to the coat layer used in the present invention as necessary, within a range in which the object of the present invention can be attained and the effect thereof is not lost. Examples of the other components include various assisting agents which are mixed in pigments for general coated paper, such as dispersants, thickening agents, water-retaining agents, antifoaming agents, and water resistant additive, and also additives such as pH adjusting agents, antiseptic agents and antioxidants.

Surfactants used in the coat layer are not particularly limited and may be appropriately selected according to the purpose. Any of anionic surfactants, cationic surfactants, amphoteric surfactants, and nonionic surfactants can be used. Of these, nonionic surfactants are particularly preferred. Addition of the surfactants enables to improve water resistance of images and also to increase the image density, thereby preventing bleeding.

Examples of nonionic surfactants include ethylene oxide adducts of higher alcohols, ethylene oxide adducts of alkyl phenols, ethylene oxide adducts of fatty acids, ethylene oxide adducts of polyhydric alcohol fatty acid esters, ethylene oxide adducts of higher aliphatic amines, ethylene oxide adducts of fatty acid amides, ethylene oxide adducts of oils and fats, ethylene oxide adducts of polypropylene glycol and, fatty acid esters of glycerol, fatty acid esters of pentaerythritol, fatty acid esters of sorbitol and sorbitan, fatty acid esters of sucrose, alkyl ethers of polyhydric alcohols, and fatty acid amides of alkanolamines. These may be used alone or in combination.

The polyhydric alcohols are not particularly limited and may be appropriately selected according to the purpose. Examples thereof include glycerol, trimethylolpropane, pentaerythritol, sorbitol, and sucrose. As for the ethylene oxide adducts, compounds in which ethylene oxide is partially substituted with an alkylene oxide such as propylene oxide or butylene oxide can be also used effectively, as long as water-solubility is kept. The substitution ratio is preferably 50% or less. The HLB (hydrophilic-lipophilic balance) of the nonionic surfactant is preferably 4 to 15, more preferably 7 to 13.

In the present invention, a cationic organic compound is not necessary to be added in the coat layer, in contrast to the common inkjet media. If necessary, a minimal amount of 2 mass % or less of the cationic organic compound may be optionally added in the total amount of the coat layer. The cationic organic compound gives offset printability to the coat layer and prevents decrease of productivity due to thickening of the coating solution for the coat layer during production. When the amount of the cationic organic compound is more than 2 mass %, the coating solution tends to thicken, and when the amount of the cationic organic compound is further increased, the coating solution outstandingly thickens to a degree where the coating solution cannot be applied.

Examples of cationic organic compounds include dimethylamine-epichlorohydrin polycondensate, dimethylamine-ammonia-epichlorohydrin polycondensate, poly(trimethylamine ethyl methacrylate-methyl sulfate), diallylamine hydrochloride-acrylamide copolymer, poly(diallylamine hydrochloride-sulfur dioxide), polyallylamine hydrochloride, poly(allylamine hydrochloride-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt condensate, dimethyl diallyl ammonium chloride, polydiallyl methyl amine hydrochloride, poly(diallyldimethyl ammonium chloride), poly(diallyldimethyl ammonium chloride-sulfur dioxide), poly(diallyldimethyl ammonium chloride-diallylamine hydrochloride derivative), acrylamide-diallyldimethyl ammonium chloride copolymer, acrylic acid salt-acrylamide-diallylamine hydrochloride copolymer, polyethyleneimine, ethyleneimine derivatives such as acrylamine polymer, and modified polyethyleneimine alkylene oxide. These may be used alone or in combination.

<Ink>

The ink of the present invention has been invented for application to media having poor ink absorption ability. The ink has a surface tension lower than that of the typical inkjet ink, thereby being excellent in wettability, and the carrier contained in the ink has high penetration ability with respect to media having less pores, thus the ink viscosity increases significantly with the penetration of even very small amounts of carrier. As a result, the adjacent dots hardly merge together after landing to the surface and dots can be formed in a stable manner even on media having very poor ink penetration ability in which the adjacent dots simply merge together. Further, because a colorant remains on the surface and practically does not penetrate the media, it is not that necessary to place the droplets on the same address, and sufficient color and image density can be obtained with a very small total amount of ink.

Because an image is formed with a total amount of ink that is greatly decreased with respect to that of the conventional inks, the amount of carrier that has to penetrate the media is decreased, curling and cockling are practically eliminated, and the rigidity of paper after printing is almost equal to that before the printing. As a result, printing can be performed without damaging the support even on the media for which the absorption of ink has not been considered. Moreover, because of high wettability, the ink is highly resistant to fingerprint left on a medium by touching with fingers, enabling to attain uniform print. When an ink having a high surface tension is used, the ink is repelled according to left fingerprint, thereby forming spots.

When the absorption of carrier ends after an ink droplet has been placed on the media surface, the colorant sets in a state in which a very small amount of wetting agent is contained. This is almost identical to the state obtained immediately after offset printing performed with an ink using soybean oil. At this time, it is necessary that the colorant and binder component remaining on the surface be homogeneously mixed, and that leveling sufficiently occur so as to have a smooth surface.

<Amount of Ink Adhesion>

In accordance with the present invention, in order to prevent the colorant contained in the ink from excessively penetrating, localize it efficiently near the medium surface, and to ensure ink drying property, it is necessary to limit severely the total amount of ink. The total amount of ink is an important parameter when an image is formed and represents the amount of ink per unit surface area where a solid image of a highest density is formed. In accordance with the present invention, by regulating the total amount of ink it is possible to form a uniform image having less beading or bleeding even on media having poor ink absorption ability. Conversely, where the ink is used in an amount above this limit, that is, as in the conventional inkjet recording process a large amount of ink is used, the colorant separation ability of the coat layer is not followed, the colorant pigment of the ink penetrates media together with the ink solvent to the back surface, and the penetration of the solvent component of the ink greatly hinders the image formation process. As a result, a high-quality image cannot be obtained.

More specifically, when the ink used of the present invention is used, the maximum amount of ink adhesion during image formation (regulated value of the total amount of ink) is preferably 20 g/$m^2$, and when an image is formed with the amount of ink adhesion that is equal to or less than this value, the image of very high quality that is free from beading and bleeding can be obtained. It has been found that amount of ink adhesion of 16 g/$m^2$ or less is even more preferred.

This can be explained as follows. By contrast with the conventional combinations of dye inks and special media for inkjet printing, in the case of the pigment ink and medium of the present invention, the colorant is present in the form of a deposit on the medium surface, and when the colorant is used in an amount necessary to cover the medium surface, the colorant in excess of this amount is wasted. Moreover, even when the high-penetration ink of the present invention is used, the extra ink solvent interferes with the adjacent dots, causing beading and bleeding.

In particular, where the regulated value of the total amount of ink is set high, as in the conventional inkjet recording, even if the ink of the present invention is used, a large amount of ink is used in solid portions and shadow portion, the colorant separation ability of the medium is exceeded, the image bleeds and drying property is greatly degraded.

The total amount of ink to be used for image formation in the present invention can be sufficiently small by comparison with that of the conventional inkjet printing method, even when a high image density is required, and by contrast with the conventional inkjet media, where the ink absorption ability of the medium itself is low, the colorant easier spreads uniformly over the medium surface. In other words, because the ink is spread thinly over the medium surface, even if the ink absorption ability is low, the ink can be dried and the bleeding and beading are hard to occur.

Further, the penetration of carrier can be easily adjusted by the amount of penetrating agent (EHD) and also the amount of fluorine surfactant FS300 that is added.

Furthermore, by decreasing the total amount of ink necessary for printing, the capacity of the ink cartridge can be reduced by comparison with that of the conventional ink cartridge, and the device can be reduced in size. Where the cartridge size is the same as in the conventional systems, the replacement frequency of the ink cartridge can be reduced and printing can be performed at a lower cost.

Basically, the smaller is the total amount of ink, the better pigment separation ability of the coat layer is exhibited, but if the total amount of ink is too small, a side effect is produced, that is, the image dot diameters after printing become too small. Therefore, it is desirable that the total amount of ink be set (regulated) within this range according to a desired image.

<Regulating the Total Amount>

A processing of "regulating the total amount" will be described below.

Figure 19:
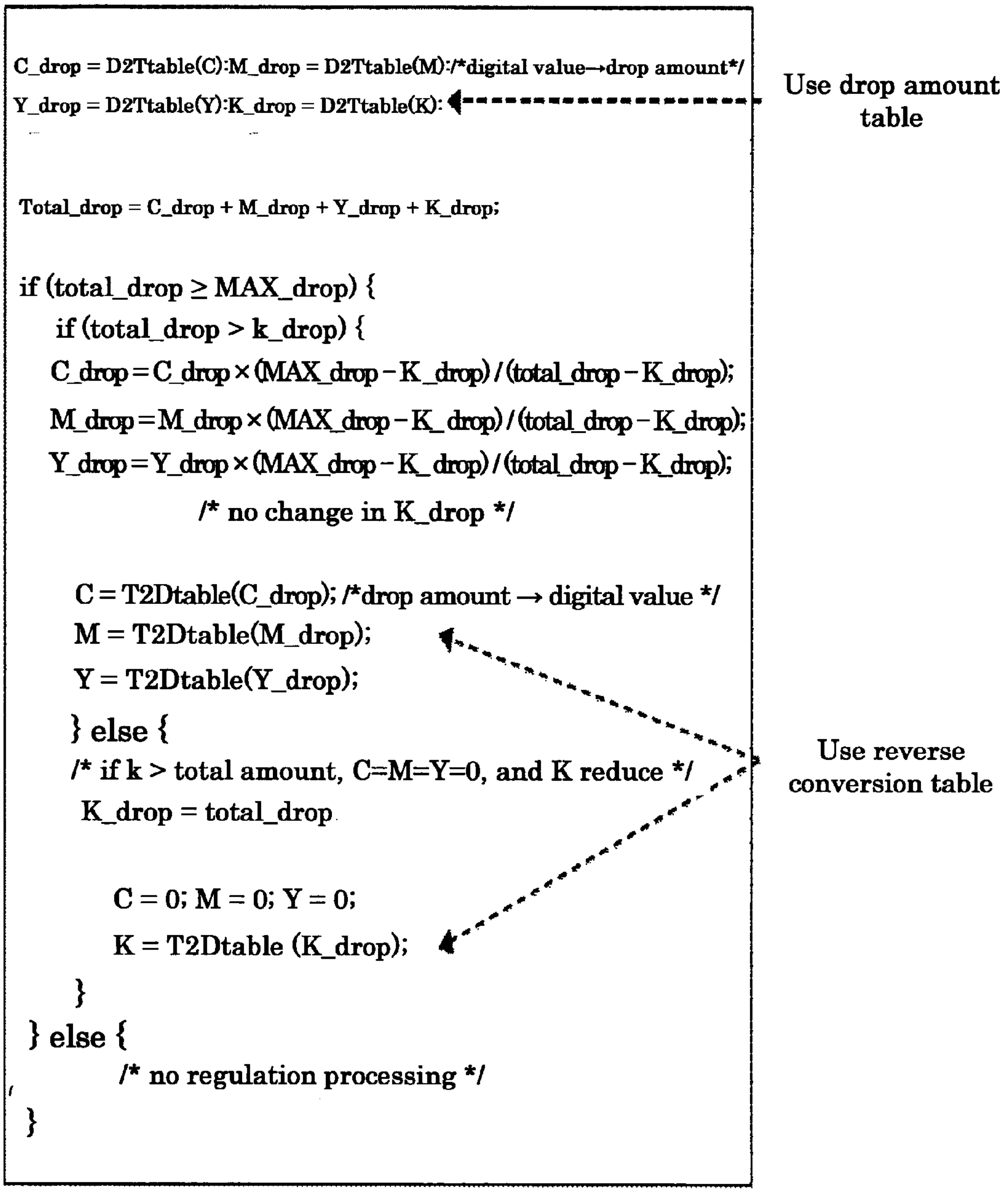
FIG. 19 shows an explanatory view of total amount control processing.

The processing of regulating the total amount is performed as shown in FIG. 19. The regulated value of the total amount as shown herein is the amount of ink droplets found from the results of evaluation performed to prevent the effects occurring when amount of ink adhesion is too high, for example, ink beading, rubbing or transfer caused by decrease in cockling resistance, and clogging of the paper.

The regulation specification of the regulated value of the total amount can be represented, for example, in a 600×600 dpi, 100×100 mask size (units: pl).

The amount of drops of the same order as the regulated value of the total amount in the usual paper and about 55% the regulated value of the total amount in a silky glossy paper that has been determined by tests conducted by the inventors of the present invention is suitable as a regulated value of the total amount in the case printing in accordance with the invention is performed on the recording medium. Further, there are cases in which the amount of drops obtained from the input values is larger than the regulated value of the total amount, as an object to which the processing of regulating the total amount is actually applied, and in such cases, the processing of suppressing the amount of drops to a level equal to or less than the regulated value of the total amount is performed by decreasing the amount of ink drops of CMY colors, while maintaining the amount of drops of Bk ink. The disposition order of the unit for regulating the total amount and the γ table can be reversed. In the present invention, the total amount of ink is measured by a weight method. More specifically, a rectangular solid image of 5 cm×20 cm is printed at a maximum concentration, on a superfine special paper (manufactured by Epson Corp.) that is a special paper for inkjet printing, the weight is measured immediately after the printing, the weight before the printing was subtracted therefor, and the value obtained was multiplied by 100 to obtain the total amount of ink.

<Ink Fixing Agent>

As other conditions relating to the pigment ink of the present invention, it is desirable that a resin component that enhances the fixation of the colorant pigment be contained in the ink. The resin component that enhances the fixation is a component that maintains the bonding strength between the colorant pigment and the medium surface or between the particles of the colorant pigment above a predetermined level. Where such resin component is absent, the colorant pigment delaminates after printing. The fixing component may be contained independently in the ink or may be adsorbed and chemically bonded to the surface of colorant particles. A low-molecular or water-soluble resin may be used as the fixing agent, but a resin emulsion is preferred in terms of controlling ink viscosity.

<Surface Tension of Ink>

As a condition of the pigment ink necessary for the present invention, it has been found that the pigment ink has a very high penetration ability, and a surface tension of 30 mN/m or less. When the surface tension is more than 30 mN/m, the penetration ability of ink is delayed and an image bleeding is occurred. Therefore, a high quality image cannot be obtained. The lower the surface tension is, the higher the separation ability of the pigment and solvent become. Thus, a lower surface tension is preferred. The surface tension of ink can be easily adjusted by the amount of penetrating agent (EHD) and the amount of fluorine surfactant FS300 added to the ink.

The ink having ultrahigh penetration of the present invention can be also printed on the conventional porous media specialized for inkjet printing. However, because the ink absorption rate is much higher than in the case of printing on the recording medium of the present invention, after the ink droplets land to the medium surface, the solvent penetrates the medium before the dots spread over the surface, thereby decreasing the dot diameter. As a result, the concentration easily decreases and graininess increases. Therefore, in order to produce a high quality image, it is necessary to perform printing by increasing resolution over than the recording medium of the present invention. As a consequence, the printing speed decreases and the consumption of ink increases. Therefore, it is desirable that the recording media of the present invention be used.

The surface tension of the ink at 25° C. is preferably 15 mN/m to 30 mN/m, and more preferably 20 mN/m to 25 mN/m. When the surface tension is less than 15 mN/m, the nozzle plate used in the present invention is excessively wetted and ink droplets cannot be properly formed, bleeding on the recording medium of the present invention is significant and stable discharge of ink sometimes cannot be attained. When the surface tension is more than 40 mN/m, the ink sometimes insufficiently penetrates the recording medium, thereby causing beading, and the extension of drying time.

The surface tension of an ink is measured, for example, by a surface tensiometer (CBVP-Z manufactured by Kyowa Interface Science Co., Ltd.) using a platinum plate at a temperature of 25° C.

<Solid Content of Ink>

The solid content of the ink of the present invention is preferably 3 mass % or more. When the concentration is lower than 3 mass %, the increase in viscosity during drying is slow and the image tends to bleed easily. The higher the solid content is, the more preferred it is, but if it is too high, nozzle clogging significantly occurs and loss of image easily occurs. Therefore, it is desirable that the solid content be 5 mass % to 15 mass %.

The support used in the present invention is one produced by mixing chemical pulps, mechanical pulps, recycled pulps and the like at a predetermined ratio, optionally adding therein an internally adding sizing agent, a yield improving agent, a paper strength additive, and the like, and making paper from the mixture by means of a fourdrinier former, a gap-type twin-wire former, or a hybride former that is a fordrinier having its latter part modified with twin-wire.

<Media and Others>

The pulps used for the support may contain: virgin chemical pulp (CP) which is obtained by chemically treating wood and its fibrous material, such as a bleached hardwood kraft pulp, a bleached softwood kraft pulp, an unbleached hard wood kraft pulp, an unbleached soft wood kraft pulp, a bleached hard wood sulfite pulp, a bleached softwood sulfite pulp, an unbleached hardwood sulfite pulp, an unbleached softwood sulfite pulp, and the like; and virgin mechanical pulp (MP) which is obtained by mechanically treating wood and its fibrous material, such as a ground pulp, a chemi-ground pulp, a chemi-mechanical pulp, a semi-chemical pulp, and the like.

The recycle pulp can also be used in the support, and raw materials of the recycle pulp are, for example, papers defined as terms of "high white", "line white", "cream white", "card", "special white", "mild white", "imitation", "color high", "Kent", "white art", "special high cut", "separate high cut", "news paper", "magazine", and the like in Standard Chart of Recycled Paper, produced by Paper Recycling Promotion Center that is Japanese non-profit foundation (the above-mentioned definitions can be found in the chart). Specific examples thereof include: printing papers such as a non-coated paper for personal computers, that is paper for information technology or the like, a thermosensitive paper, a pressure sensitive paper, and the like; a recycled OA paper such as paper for PPC; an art paper, a coated paper, a slightly coated paper, a matte paper, and the like; recycle papers or cardboards of high quality papers, of high quality color papers, of a paper from note books, of a paper from letter pads, of lapping papers, of fancy papers, of middle quality papers, of news paper, of bank papers, of lapping papers used in supermarkets, of imitation papers, of pure-white rolling papers, of non-coated papers such as milk cartons, and the like, and those examples listed above are papers containing chemical pulps, papers containing high yield pulps, and the like. These may be used alone of in combination.

The recycled pulp is generally produced by the combination of the following four steps.

(1) Breaking out of a recycled paper is carrier out by treating the paper with mechanical force or chemical by means of a pulper so as to break down to fibers, and detaching the printing ink from the fibers.

(2) Removal of dusts is carried out by removing foreign substances (for example, plastics and the like) and dusts obtained in the recycled paper by a screen or a cleaner.

(3) Removal of an ink is carrier out by removing the detached ink from the fibers using a surfactant in accordance with a flotation method or washing method, to thereby remove from the system.

(4) Bleaching is carrier out by using an oxidation reaction or a reduction reaction to thereby increase whiteness of the fibers.

In the case where the recycled pulp is added to the pulp used for the support, the mixing amount of the recycled pulp is preferably 40 mass % or less based on the total amount of the pulp for the purpose of preventing curling of the support after recording.

As a filler which can be used in the support, calcium carbonate is effective, but calcium carbonate can be used in combination with inorganic additives such as silicas, for example, kaolin, calcined clay, pyrophylite, sericite, silicic acids such as talc, and the like; organic pigments such as satin white, barium sulfate, calcium sulfate, zinc sulfate, and a plastic pigment, a urea resin, and the like.

The internally adding sizing agent used in the support is not particularly limited and may be suitably selected from conventional internally adding sizing agents used for inkjet recording media and commercial printing media. Suitable internally adding sizing agents are, for example, a rosin emulsion sizing agent, and the like. In order to increase a surface pH of paper, a neutral rosin sizing agent used for making neutral paper, alkenyl succinic anhydride (ASA), alkyl ketene dimer (AKD), petroleum resin sizing agent, or the like are preferably used. Of these, the neutral rosin sizing agent or alkenyl succinic anhydride is particularly suitable.

The amount of the internally adding sizing agent is 0.1 parts by mass to 0.7 parts by mass relative to 100 parts by mass of bone-dry pulp, but it is not limited thereto.

The internal additives used in the support are, for example, conventionally known pigments as a white pigment. Examples of the white pigments include inorganic white pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, silious earth, calcium silicate, magnesium silicate, synthetic silica, aluminum hydroxide, alumina, lithopone, zeolite, magnesium carbonate and magnesium hydroxide; organic pigments such as styrene plastic pigment, acrylic plastic pigment, polyethylene, microcapsule, urea resin and melamine resin. These may be used alone or in combination.

<Production of Coat Layer>

A method for forming the coat layer over the support is not particularly limited and may be selected from a method for directly coating, a method for coating on a temporarily support, and then transferring to the support, and a method for atomizing using a spray or the like. Examples of the method for directly coating include a roll-coater method, an air-knife coater method, a gate-roll coater method, a size-press method, a shim-sizer method, a film transfer system such as rod-metaling size press coater and a blade coater system by fountain or roll application.

Of these, air-knife coater method is preferred.

The amount of the coated solution for coat layer is not particularly limited and may be appropriately selected according to the purpose. It is preferred that the amount of solid content be 5 $g/m^2$ to 20 $g/m^2$. When this amount is less than 5 $g/m^2$, the ink colorant component cannot be sufficiently separated. As a result, the colorant penetrates the paper, causing decrease in concentration or bleeding of characters.

Drying may be performed as necessary, after impregnation or coating of the solution. The drying temperature in this case is not particularly limited and may be appropriately selected according to the purpose. The temperature is preferably about 100° C. to 250° C.

The drying treatment of the coat layer can be performed, for example, by using a hot-blow drying furnace or a hot drum.

The coat layer may consist of one layer or a plurality of layers.

The medium of the present invention is subjected to calender treatment to obtain a desired glossiness after drying the coat layer.

The calender treatment is not particularly limited and may be appropriately selected according to the purpose. Examples thereof include super calender, soft calender and gloss calender. Examples of methods for controlling gloss include control of the number of steps of calendering, control of nip pressure, control of linear speed, and control of calendering temperature.

The basis weight of the recording medium of the present invention is preferably 50 $g/m^2$ to 250 $g/m^2$. When it is less than 50 $g/m^2$, the stiffness is insufficient and conveying defects can easily occurs, for example, the conveying path can be clogged with the recording medium. When the basis weight of recording medium is more than 250 $g/m^2$, the stiffness is too high and the recording medium is not bent in the curved portions of the conveying path, thereby causing conveying defects such as clogging of the conveying path with the recording medium.

<Ink>

The pigment ink of the present invention contains at least water, colorant particles, an ink fixing agent, and water soluble organic solvent, glycerin and surfactant, wherein the pigment ink has a surface tension of 15 mN/m to 30 mN/m. The pigment ink further contains a wetting agent and other components, as necessary. These components are dispersed or dissolved in an aqueous solvent, and further stirred and mixed as necessary, so as to produce the pigment ink of the present invention. The dispersing may be performed with a sand mill, a homogenizer, a ball mill, a paint shaker, or an ultrasonic dispersing machine, and the stirring and mixing may be performed by using a stirring machine using a typical blade, a magnetic stirrer, or a high-speed dispersing machine.

Physical properties of the ink such as viscosity, surface tension, and pH are preferably within the following ranges.

Viscosity of the ink is preferably 1 cps to 30 cps, more preferably 2 cps to 20 cps, at a temperature of 25° C. When the viscosity is higher than 20 cps, discharge stability may be difficult to be ensured.

The pH is preferably 7 to 10, for example.

—Colorant—

The color of the ink is not particularly limited and may be appropriately selected according to the purpose. Examples of the colors include yellow, magenta, cyan, and black. When recording is performed by using an ink set employing the combination of two or more colors, a multicolor image can be formed, and when recording is performed by using an ink set employing a full-color combination, a full-color image can be formed.

Examples of cyan colorants used in the present invention include C. I. Pigment Blue 1, 2, 3, 15 (Copper Phthalocyanine Blue R), 15:1, 15:2, 15:3 (Phthalocyanine Blue G), 15:4, 15:6 (Phthalocyanine Blue E), 15:34, 16, 17:1, 22, 56, 60, 63, C. I. Vat Blue 4, and Vat Blue 60. From the standpoint of cost and safety, Phthalocyanine Blue 15:3 is particularly preferred.

Colorants for other colors are not particularly limited, as long as they are in the form of powders.

As the colorant, a colorant selected from any one of a pigment, dye, and colored fine particle is preferably used.

As the colored fine particles, an aqueous dispersion of fine polymer particles containing a colorant selected from any one of a pigment and dye can be advantageously used.

The expression "containing . . . colorant" herein means either any one of a state in which the colorant is encapsulated inside the fine polymer particles and a state in which the colorant is adsorbed on the surface of polymer particles, or both such states. In this case, it is not necessary that the all colorants contained in the ink of the present invention be encapsulated in or adsorbed on the fine polymer particles, and the colorant may be also dispersed in the emulsion within a range in which the effect of the present invention is not lost. The colorant is not particularly limited, as long as it is insoluble or has poor solubility in water and can be adsorbed on the polymer, and the colorant may be appropriately selected according to the purpose.

The expression "insoluble or has poor solubility in water" means that the colorant is not dissolved in an amount of 10 parts by mass or more in 100 parts by mass of water at a temperature of 20° C. "Soluble" means that no separation or precipitation of the colorant can be visually observed in the surface layer or lower layer of aqueous solution.

The volume-average particle size of fine polymer particles (colored fine particles) containing the colorant is preferably 0.01 μm to 0.16 μm in the ink. When the particle size is less than 0.01 μm, the fine particles easily flow, thereby increasing the ink bleeding in character and degrading light resistance. On the other hand, the particle size is more than 0.16 μm, the nozzle is easily clogged and color development ability is decreased.

Examples of colorants include dyes and pigments such as water-soluble dyes, oil-soluble dyes, and dispersed dyes. Oil-soluble dyes and dispersed dyes are preferred from the standpoint of adsorption ability and sealing ability, but pigments can be advantageously used to ensure light resistance of the image to be obtained.

From the standpoint of effective impregnation into the fine polymer particles, it is preferred that the dyes be dissolved to a concentration of 2 g/L or more, more preferably 20 g/L to 600 g/L, in an organic solvent such as a ketone solvent.

The water-soluble dyes can be classified into acidic dyes, direct dyes, basic dyes, reactive dyes, and food dyes, based on the color index thereof, and it is preferred that dyes excelling in water resistance and light resistance be used.

Self-dispersible pigments in which at least one hydrophilic group is bonded directly or via another atomic group to the pigment surface and which can be dispersed with good stability, without using a dispersant, can be advantageously used as the pigments. As a result, a dispersant that has been used in the conventional inks to disperse the pigment is not necessary. Ionic pigments are preferred as the self-dispersible pigments, and anionically charged pigments are particularly preferred.

The self-dispersible pigment has a volume-average particle size of preferably 0.01 μm to 0.16 μm in the ink.

Examples of anionic hydrophilic groups include —COOM, $—SO_3M$, $—PO_3HM$, $—PO_3M_2$, $—SO_2NH_2$, $—SO_2NHCOR$ (where M stands for a hydrogen atom, an alkali metal, ammonium, or an organic ammonium; R is an alkyl group having 1 to 12 carbon atoms, a substituted or unsubstituted phenyl group, or a substituted or unsubstituted naphthyl group). Of these, pigments in which —COOM and $—SO_3M$ bonded to the color pigment surface are preferably used.

As for "M" in the aforementioned hydrophilic groups, examples of suitable alkali metals include lithium, sodium, and potassium. Examples of organic ammonium include mono- to trimethylammonium, mono- to triethylammonium, and mono- to trimethanolammonium. Examples of methods for obtaining the anionically charged color pigments include methods by which —COONa is introduced into the color pigment surface, such as a method using oxidization the color pigment with sodium hypochlorite, a method using sulfonation treatment, and a method using reaction with a diazonium salt.

A pigment dispersion using a pigment dispersant can be also used in the present invention. Examples of pigment dispersants include natural hydrophilic polymer compounds such as vegetable polymers, e.g., gum arabic, tragacanth gum, gua gum, karaya gum, locust bean gum, arabinogalactan, pectin, and queen's seed starch; seaweed polymers such as alginic acid, carrageenen, and agar; animal polymers such as gelatin, casein, albumen, and collagen; and microorganism polymers such as xanthene gum and dextran. Examples of suitable semisynthetic materials include fibrous polymers such as such as methyl cellulose, ethyl cellulose, hydroxyethyl cellulose, hydroxypropyl cellulose, and carboxymethyl cellulose; starch polymers such as sodium glycolate starch and sodium ester phosphate starch; seaweed polymers such as sodium alginate and propylene glycol ester alginate. Examples of pure synthetic materials include vinyl polymers such as polyvinyl alcohol, polyvinyl pyrrolidone, and polyvinyl methyl ether; acrylic polymers such as non-crosslinked polyacrylamide, polyacrylic acid or alkali metal salt thereof, and water-soluble styrene acrylic resin; and natural polymer compounds such as water-soluble styrene maleic acid resin, water-soluble vinyl naphthalene acrylic resin, water-soluble vinyl naphthalene maleic acid resin, polyvinyl pyrrolidone, polyvinyl alcohol, alkali metal salt of β-naphthalenesulfonic acid formalin condensate, polymer compounds having a salt of a cationic functional group such as quaternary ammonium or amino group in the side chain thereof, and shellac. Of these, compounds, in which a carboxyl group, such as homopolymers of acrylic acid, methacrylic acid, or styrene acrylic acid, or copolymers of monomers having other hydrophilic groups are introduced, are particularly preferred as the polymer dispersant.

The mass-average molecular mass of the copolymer is preferably 3,000 to 50,000, more preferably 5,000 to 30,000 and still more preferably 7,000 to 15,000. The mixing mass ratio of the pigment and the dispersant is preferably within a range of 1:0.06 to 1:3, more preferably within a range of 1:0.125 to 1:3.

The amount of the colorant added to the ink is preferably 2 mass % to 15 mass % and more preferably 3 mass % to 12 mass %. When the amount of the colorant is less than 2 mass %, image density may be decreased due to lowered coloring strength, and feathering or bleeding may be adversely affected due to lowered viscosity. When the amount of the colorant is more than 15 mass %, a nozzle easily dries up, for example, when the inkjet recording apparatus is allowed to stand, resulting in a no-discharge phenomenon. Furthermore, due to the excessively high viscosity, penetration ability is decreased and dots less spread. Therefore, image density may be decreased and rough image may be obtained.

<Water Soluble Organic Solvent>

A water soluble organic solvent is preferably used in addition to the colorant, so as to give the ink desired physical properties, or to prevent the nozzle of a recording head from clogging due to drying. The water soluble organic solvent includes a wetting agent and penetrating agent.

—Penetrating Agent—

The penetrating agent is used to improve wettability with a recording medium and adjust penetration speed. As the penetrating agent, water-soluble organic solvents such as polyol compounds and glycol ether compounds are used. Specific examples of penetrating agents include polyol compounds having 8 or more carbon atoms and glycol ether compounds.

When the number of carbon atoms in the polyol compound is less than 8, sufficient penetration ability cannot be obtained, recording medium is contaminated during printing on both sides, spread of ink on the recording medium is insufficient, and cover ratio of pixel is decreased. As a result, character quality or image density may be sometimes decreased.

Examples of polyol compounds having 8 or more carbon atoms include 2-ethyl-1,3-hexanediol (solubility 4.2% at 25° C.) and 2,2,4-trimethyl-1,3-pentanediol (solubility 2.0% at 25° C.).

The glycol ether compounds are not particularly limited and may be appropriately selected according to the purpose. Examples thereof include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

The amount of the penetrating agent added to the ink is not particularly limited and may be appropriately selected according to the purpose. It is preferably 0.1 mass % to 20 mass %, and more preferably 0.5 mass % to 10 mass %.

The amount of the water-soluble organic solvent added to the ink is preferably 0.1 mass % to 20 mass %, and more preferably 0.5 mass % to 10 mass %.

—Wetting Agent—

The wetting agent is not particularly limited and may be appropriately selected according to the purpose. For example, at least one selected from polyol compounds, lactam compounds, urea compounds, γ-butyrolactam and saccharides is advantageously used. The wetting agent is added to the ink to prevent the nozzle of the recording head from clogging due to drying.

Examples of polyol compounds include polyhydric alcohols, polyhydric alcohol alkyl ethers, polyhydric alcohol aryl ethers, nitrogen-containing heterocyclic compounds, amides, amines, sulfur compounds, propylene carbonates, and ethylene carbonate. These may be used alone or in combination.

Examples of polyhydric alcohol include ethylene glycol, diethylene glycol, triethylene glycol, tetraethylene glycol, polyethylene glycol, propylene glycol, polypropylene glycol, 1,3-propanediol, 2-methyl-1,3-propanediol, 1,3-butanediol, 1,4-butanediol, 3-methyl-1,3-butanediol-1,3-propanediol, 1,5-pentanediol, 2-ethyl-1,3-hexanediol, 1,6-hexanediol, glycerol, 1,2,6-hexanetriol, 1,2,4-butanetriol, 1,2,3-butanetriol, and petriol.

Examples of polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether.

Examples of polyhydric alcohol aryl ethers include ethylene glycol monophenyl ether and ethylene glycol monobenzyl ether.

Examples of nitrogen-containing heterocyclic compounds include N-methyl-2-pyrrolidone, N-hydroxyethyl-2-pyrrolidone, 2-pyrrolidone, 1,3-dimethylimidazolidinone, and ϵ-caprolactam.

Examples of amides include formamide, N-methylformamide, formamide, N,N-dimethyl formamide.

Examples of amines include monoethanolamine, diethanolamine, triethanolamine, monoethylamine, diethylamine, and triethylamine.

Examples of sulfur compounds include dimethylsulfoxide, sulfolan, and thiodiethanol.

Of these compounds, from the standpoint of obtaining excellent effect in solubility and preventing discharge failure due to moisture evaporation, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol-1,3-propanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, or N-hydroxyethyl-2-pyrrolidone is suitably used.

As the lactam compound, at least one selected from 2-pyrrolidone, N-methyl-2-pyrrolidone, N-hydroxyethyl-2-pyrrolidone, and ϵ-caprolactam may be used.

As the urea compound, at least one selected from urea, thiourea, ethyleneurea, and 1,3-dimethyl-2-imidazolidinone may be used. The amount of the urea compound added to the ink is generally preferably 0.5 mass % to 50 mass % and more preferably 1 mass % to 20 mass %.

Examples of saccharides include monosaccharides, disaccharides, oligosaccharides (including trisaccharides and tetrasaccharides), polysaccharides, and derivatives thereof. Of these, glucose, mannose, fructose, ribose, xylose, arabinose, galactose, maltose, cellobiose, lactose, sucrose, trehalose, and maltotriose are preferred and maltitose, sorbitose, gluconolactone, and maltose are particularly preferred.

The polysaccharides mean sugars in a broad sense and may include substances widely present in natural world, such as α-cyclodextrin and cellulose.

Examples of the derivatives of the saccharides include reduced sugar of the saccharides (for example, sugar alcohol, represented by a general formula $HOCH_2(CHOH)_nCH_2OH$ (where n represents an integer of 2 to 5)), oxidized sugar (for example, aldonic acid and uronic acid), amino acids, and thio acid. Of these, sugar alcohol is preferred. Examples of sugar alcohols include maltitol and sorbitol.

The amount of the wetting agent contained in the ink is 10 mass % to 50 mass % and more preferably 20 mass % to 35 mass %. When the amount of the contained wetting agent is too small, a nozzle may easily dried, causing abnormal discharge of ink droplets. When the amount of the contained wetting agent is too large, viscosity of ink increases, exceeding the appropriate viscosity range.

—Surfactant—

The surfactant is not particularly limited and may be appropriately selected according to the purpose. Examples of surfactants include anionic surfactants, nonionic surfactants, amphoteric surfactants, acetylene glycol surfactants, and fluorine surfactants.

Examples of anionic surfactants include polyoxyethylene alkyl ether acetate, dodecylbenzene sulfonate, salts of lauric acid, and polyoxyethylene alkyl ether sulfate salts. These surfactants can decrease the surface tension of the liquid so as to enhance wettability and penetration speed.

Examples of nonionic surfactants include acetylene glycol surfactants, polyoxyethylene alkyl ethers, polyoxyethylene alkyl phenyl ethers, polyoxyethylene sorbitan fatty acid esters, polyoxypropylene polyoxyethylene alkyl ethers, polyoxyethylene alkyl esters, polyoxyethylene sorbitan fatty acid esters, polyoxyethylene alkylamines, polyoxyethylene alkylamides; polyvalent alcohol alkyl ethers and polyvalent alcohol aryl ethers such as diethylene glycol monophenylether, ethylene glycol monophenylether, ethylene glycol monoallylether, diethylene glycol monobutylether, propylene glycol monobutylether, tetraethylene glycol chlorophenyl ether; and polyoxyethylene-polyoxypropylene block copolymer.

Examples of acetylene glycol surfactants include 2,4,7,9-tetramethyl-5-decyne-4,7-diol, 3,6-dimethyl-4-octyne-3,6-diol, and 3,5-dimethyl-1-hexyne-3-ol. Examples of commercial products of the acetylene glycol surfactants include Surfynol 104, 82, 465, 485, TG, manufactured by Air Products and Chemicals Inc. (U.S.A.).

Examples of the amphoteric surfactants include laurylamino propionate, lauryl dimethyl betaine, stearyl dimethyl betaine, and lauryl dihydroxyethyl betaine. Specific examples thereof include lauryl dimethyl amine oxide, myristyl dimethyl amine oxide, stearyl dimethyl amine oxide, dihydroxyethyl lauryl amine oxide, polyoxyethylene palm oil alkyl dimethyl amine oxide, dimethyl alkyl (palm) betaine, and dimethyl lauryl betaine.

Of these surfactants, the surfactants represented by the following General Formulas (I), (II), (III), (IV), (V), and (VI) are preferred.

$R^1$—O—$(CH_2CH_2O)_hCH_2COOM$ General Formula (I)

where $R^1$ represents an alkyl group, and h represents an integer of 3 to 12; M represents any one selected from alkali metal ions, quaternary ammonium, quaternary phosphonium, and alkanolamines.

General Formula (II)

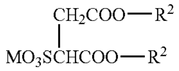

where $R^2$ represents an alkyl group; M represents any one selected from alkali metal ions, quaternary ammonium, quaternary phosphonium, and alkanolamines.

General Formula (III)

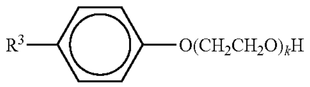

where $R^3$ represents a hydrocarbon group; k represents an integer of 5 to 20.

$R^4$—$(OCH_2CH_2)_jOH$ General Formula (IV)

where $R^4$ represents a hydrocarbon group; j represents an integer of 5 to 20.

General Formula (V)

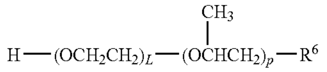

where $R^6$ represents a hydrocarbon group; L and p respectively represent an integer of 1 to 20.

General Formula (VI)

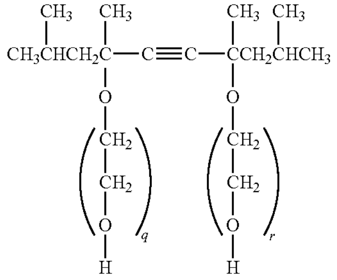

where q and r respectively represent an integer of 0 to 40.

The surfactants represented by the above General Formulas (I) and (II) are specifically shown below in the form of free acids:

(I-1):

$CH_3(CH_2)_{12}O(CH_2CH_2O)_3CH_2COOH$ (I-2):

$CH_3(CH_2)_{12}O(CH_2CH_2O)_4CH_2COOH$ (I-3):

$CH_3(CH_2)_{12}O(CH_2CH_2O)_5CH_2COOH$ (I-4):

$CH_3(CH_2)_{12}O(CH_2CH_2O)_6CH_2COOH$ (I-5):

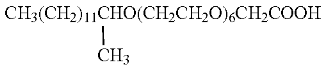

(I-6):

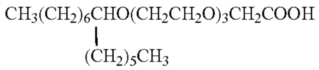

(II-1):

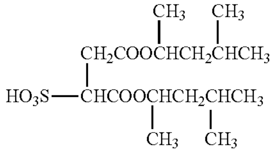

(II-2):

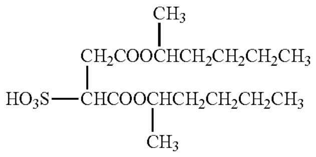

-continued (II-3):

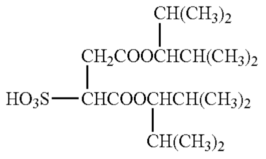

(II-4):

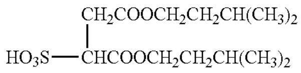

The preferred fluorine surfactants are represented by the following General Formula (II-5).

$$CF_3CF_2(CF_2CF_2)_m—CH_2CH_2O(CH_2CH_2O)_nH \quad \text{General Formula (II-5)}$$

where m represents an integer of 0 to 10; n represents an integer of 1 to 40.

Examples of fluorine surfactants include perfluoroalkyl sulfonic acid compounds, perfluoroalkyl carboxyl compounds, perfluoroalkyl phosphoric acid ester compounds, perfluoroalkyl ethylene oxide adducts and polyoxyalkylene ether polymer compounds having a perfluoroalkyl ether group in the side-chain. Of these, polyoxyalkylene ether polymer compounds having a perfluoroalkyl ether group in the side-chain are particularly preferred because of low foaming property and high safety because they have low bioaccumulation ability of fluorine compounds, which has recently been viewed as a problem.

Examples of the perfluoroalkyl sulfonic acid compounds include perfluoroalkyl sulfonic acids and perfluoroalkyl sulfonates.

Examples of the perfluoroalkyl carboxyl compounds include perfluoroalkyl carboxylic acids and perfluoroalkyl carboxylates.

Examples of the perfluoroalkyl phosphoric acid ester compounds include perfluoroalkyl phosphoric acid esters and salts of perfluoroalkyl phosphoric acid esters.

Examples of the polyoxyalkylene ether polymer compounds having a perfluoroalkyl ether group in the side-chain include polyoxyalkylene ether polymers having a perfluoroalkyl ether group in the side-chain, sulfates of polyoxyalkylene ether polymer having a perfluoroalkyl ether group in the side-chain, and salts of polyoxyalkylene ether polymers having a perfluoroalkyl ether group in the side-chain.

Examples of counter ions of salts in the fluorine surfactants include Li, Na, K, $NH_4$, $NH_3CH_2CH_2OH$, $NH_2(CH_2CH_2OH)_2$, and $NH(CH_2CH_2OH)_3$.

As the fluorine surfactants, appropriately synthesized surfactants or commercial products may be used.

Examples of commercially available products include SURFLON S-111, S-112, S-113, S-121, S-131, S-132, S-141, S-145 (manufacture by Asahi Glass Co., Ltd), FRORARD FC-93, FC-95, FC-98, FC-129, FC-135, FC-170C, FC-430, FC-431 (manufacture by Sumitomo 3M Limited), Megafac F-470, F1405, and F-474 (manufacture by DIC Corporation), Zonyl TBS, FSP, FSA, FSN-100, FSN, FSO-100, FSO, FS-300, and UR (manufacture by DuPont), FT-110, FT-250, FT-251, FT-400S, FT-150, FT-400SW (manufacture by NEOS Company Limited), and PF-151N (manufacture by Omnova Solutions Inc.). Of these, Zonyl FS-300, FSN, FSN-100, and FSO (manufacture by DuPont) are particularly preferred in terms of being excellent in reliability and color developing improvement.

The fluorine surfactant has a surface tension at 25° C. is preferably 30 mN/m or less, more preferably 25 mN/m or less.

As the surfactant, other than the compounds expressed above, lower alcohols such as ethanol and 2-propanol can be used.

Any resin emulsion can be used as the ink fixing agent.

—Resin Emulsion—

In the resin emulsion, fine resin particles are dispersed in water as a continuous phase. The resin emulsion may include a dispersant such as a surfactant, as necessary.

As the dispersed phase, the amount of fine resin particles (amount of resin particle in the resin emulsion) is generally preferably 10 mass % to 70 mass %. Moreover, with consideration for the use in an inkjet recording apparatus, the fine resin particles have an average particle diameter of preferably 10 nm to 1,000 nm and more preferably 20 nm to 300 nm.

The fine resin particle component of the dispersed phase is not particularly limited and may be appropriately selected according to the purpose. Examples thereof include an acrylic resin, vinyl acetate resin, styrene resin, butadiene resin, styrene-butadiene resin, vinyl chloride resin, acryl-styrene resin, and acryl-silicone resin. Of these, acryl-silicone resin is particularly preferred.

As the resin emulsion, appropriately synthesized resin emulsions or commercial products may be used.

Examples of commercially available products include Micro Gel E-1002 and E-5002 (styrene-acrylic resin emulsions manufactured by Nippon Paint Co., Ltd.), Bon Coat 4001 (acrylic resin emulsion manufactured by DIC Corporation), Bon Coat 5454 (styrene-acrylic resin emulsion manufactured by DIC Corporation), SAE-1014 (styrene-acrylic resin emulsion manufactured by Zeon Corporation), Saivinol SK-200 (acrylic resin emulsion manufactured by Saiden Chemical Industry Co., Ltd.), Primal AC-22 and AC-61 (acrylic resin emulsions manufactured by Rohm and Haas Co., Ltd.), Nanocryl SBCX 2821 and 3689 (acrylic silicone resin emulsions manufactured by Toyo Ink Mfg. Co. Ltd.), and #3070 (methyl methacrylate copolymer resin emulsion manufactured by Mikuni Color Ltd.).

It is preferred that the amount of fine resin particles of the resin emulsion that is added to the ink be 0.1 mass % to 50 mass %, more preferably 0.5 mass % to 20 mass %, and still more preferably 1 mass % to 10 mass %. When the amount of fine resin particles is less than 0.1 mass %, a sufficient effect cannot be obtained in preventing clogging and improving discharge stability, and when the amount is more than 50 mass %, it may decrease the storage stability of the ink.

—Other Components—

Other components are not particularly limited and may be appropriately selected according to the purpose. Examples thereof include pH adjusting agents, antiseptic/antifungal agents, antirust agents, antioxidants, UV absorbers, oxygen absorbers, and photostabilizers.

Examples of antiseptic/antifungal agents include 1,2-benzisothiazoline-3-one, sodium dehydroacetate, sodium sorbate, 2-pyridinethiol-1-oxide sodium, sodium benzoate, pentachlorophenol sodium, benzotriazole and isothiazoline compound. By addition of the antiseptic/antifungal agent in the ink, development of fungus can be suppressed to enhance storage stability and stability of image quality.

The pH adjusting agents are not particularly limited and any substance can be used according to the purpose, as long as it can adjust pH to 7 or more, without adversely affecting the ink to be prepared.

Examples of suitable pH adjusting agents include amines such as diethanolamine and triethanolamine, alkali metal hydroxides such as lithium hydroxide, sodium hydroxide, and potassium hydroxide, ammonium hydroxide, quaternary ammonium hydroxide, quaternary phosphonium hydroxide; and alkali metal carbonates such as lithium carbonate, sodium carbonate, and potassium carbonate.

Examples of antirust agents include acidic sulfite, sodium thiosulfate, ammonium thiodiglycolate, diisopropyl ammonium nitrate, pentaerythritol tetranitrate, and dicyclohexylammonium nitrate. By addition of the antirust agent in the ink, a coating is formed on a metal surface of a head and the like which contacts the liquid, thereby preventing corrosion.

Examples of antioxidants include phenol antioxidants (including hindered phenol antioxidants), amine antioxidants, sulfur antioxidants, and phosphorus antioxidants. By addition of the antirust agent in the ink, radical species causing corrosion can be annihilated when they are generated, thereby preventing corrosion.

Examples of the phenol antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis(1,1-dimethyl-2-[β-(3-tert-butyl-4-hydroxy-5-methylphenyl)propionyloxy]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetraxis[methylene-3-(3',5'-di-tert-butyl-4'-hydroxyphenyl)propionate]methane, compounds such as hydroquinone, gallate; 2,6-di-tert-butyl-p-creosol, 4,4'-thiobis(3-methyl-6-tert-butylphenol) and tris (3,5-di-tert-butyl-4-hydroxybenzyl) isocyanurate.

Examples of the amine antioxidants include phenyl-β-naphthylamine, α-naphthylamine, N,N'-di-sec-butyl-p phenylenediamine, phenothiazine, N,N'-diphenyl-p-phenylenediamine, 2,6-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraxis[methylene-3-(3,5-di-tert-butyl-4-dihydroxyphenyl)propionate]methane, 1,1,3-tris(2-methyl-4-hydroxy-5-tert-butylphenyl)butane, N,N'-β-naphthyl-p-phenylene diamine, N,N'-diphenylethylendiamine and 4,4'-tetramethyl-diaminodiphenylmethane.

Examples of the sulfur antioxidants include dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole, dilauryl sulfite, dilauryl thiodipropionate, dimyristyl thiodipropionate, distearyl β,β'-thiodibutyrate and 2-mercapto benzoimidazole.

Examples of the phosphorous antioxidants include triphenyl phosphite, octadecyl phosphite, triisodecyl phosphite, trilauryl trithiophosphite, trinonylphenyl phosphite, tridecyl phosphite, diphenyl isodecyl phosphite, and distearyl pentaerythritol phosphite.

Examples of the ultraviolet ray absorbers include benzophenone ultraviolet ray absorbers, benzotriazole ultraviolet ray absorbers, salicylate ultraviolet ray absorbers, cyanoacrylate ultraviolet ray absorbers, and nickel complex salt ultraviolet ray absorbers.

Examples of the benzophenone ultraviolet ray absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole ultraviolet ray absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet ray absorbers include phenyl salicylate, p-tert-butylphenyl salicylate, and p-octylphenyl salicylate.

Examples of the cyanoacrylate ultraviolet ray absorbers include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate, Examples of the ultraviolet ray absorbers of nickel complex salts include nickel bis(octylphenyl) sulfide, 2,2'-thiobis (4-tert-octylphelate)-n-butylamine nickel (II), 2,2'-thiobis(4-tert-octylphelate)-2-ethylhexylamine nickel (II) and 2,2'-thiobis(4-tert-octylphelate) triethanolamine nickel (II).

The ink of the present invention may contain a pH adjusting agent. Examples of the pH adjusting agents include hydroxides of alkali metal elements such as lithium hydroxide, sodium hydroxide, and potassium hydroxide; and carbonates of alkali metals such as ammonium hydroxide, quaternary ammonium hydroxide, quaternary phosphonium hydroxide, lithium carbonate, sodium carbonate, and potassium carbonate; amines such as diethanolamine and triethanolamine; and boric acid, hydrochloric acid, nitric acid, sulfuric acid and acetic acid.

The ink preferably has a surface tension of 25 dyne/cm or less, and more preferably has a surface tension of 23 dyne/cm or less, in terms of satisfying both wettablitity with a recording medium and formation of droplet.

The ink preferably has a viscosity of 1.0 cP to 20.0 cP, and more preferably 3.0 cP to 10.0 cP in terms of discharge stability.

The ink preferably has a pH of 3 to 11, and more preferably of 6 to 10, in terms of preventing a metal member contacting with the liquid from corrosion.

<Printer>

The ink of the present invention in the ink media set can be advantageously used in printers using the following inkjet heads: a so-called piezo-type inkjet head in which a piezoelectric element is used as a pressure generating unit that pressurizes ink located in an ink channel to deform an oscillation plate forming a wall surface of the ink channel, and the internal volume of the ink channel is changed thereby discharging an ink droplet (see Japanese Patent Application Laid-Open (JP-A) No. 2-51734), a so-called thermal-type inkjet head that uses a heat-generating resistor to heat the ink in an ink channel and generate gas bubbles (see JP-A No. 61-59911), and an electrostatic inkjet head in which an oscillation plate forming a wall surface of an ink channel is disposed opposite an electrode and the oscillation plate is deformed by electrostatic forces generated between the oscillation plate and the electrode so as to change the internal volume of the ink channel, thereby discharging an ink droplet (see JP-A No. 6-71882).

<Ink Cartridge>

In an ink cartridge used in the present invention, the ink of the present invention in the ink media set is contained in a container. The ink cartridge may have appropriately selected other components, as necessary. The container is not particularly limited, and the shape, structure, size and material thereof may be appropriately selected according to the purpose. For example, the container having at least an ink bag formed from an aluminum laminated film, a resin film, or the like is preferred.

The ink cartridge will be explained below with reference to FIGS. 1 and 2. Here, FIG. 1 shows an example of an ink cartridge used in the present invention, and FIG. 2 also shows an ink cartridge shown in FIG. 1, which includes a case (housing).

Figure 2:
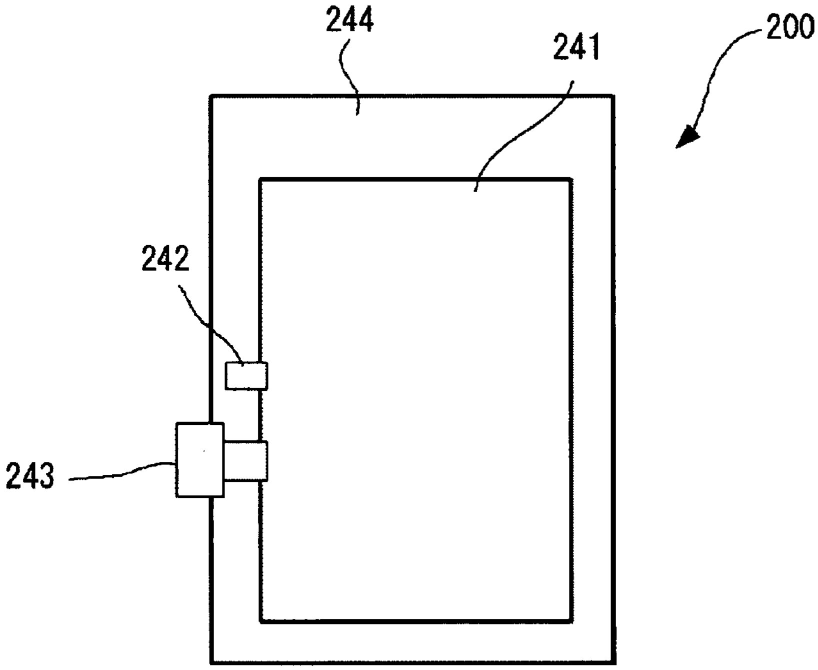
FIG. 2 shows a schematic view of an example of an ink cartridge including a case (housing) shown in FIG. 1.

As shown in FIG. 1, in the ink cartridge 200, from an ink charging port 242 an ink bag 241 is filled with an ink and air is removed, and then the ink charging port 242 is closed by fusion bonding. When the ink cartridge is used, an ink discharge port 243 made from a rubber member is pierced with a needle of the apparatus body and the ink is supplied into the apparatus.

The ink bag 241 is formed from a packaging material such as an aluminum laminated film having no air permeability. As shown in FIG. 2, the ink bag 241 is usually contained inside a plastic cartridge case (housing) 244 and can be used by detachably mounting on inkjet recording apparatuses of various kinds.

The ink cartridge used in the present invention contains the inkjet ink in the ink media set and can be used by detachably mounting on inkjet recording apparatuses of various kinds. It can be particularly advantageously used by detachably mounting on the below-described inkjet recording apparatus of the present invention.

<Inkjet Recording Method and Inkjet Recording Apparatus>

The inkjet recording apparatus of the present invention contains at least an inkjetting unit, and further includes other units suitably selected as necessary, such as a stimulus generating unit and a controlling unit.

The inkjet recording method of the present invention includes at least an inkjetting step, and further includes other steps suitably selected as necessary, such as a stimulus generating step and a controlling step.

The inkjet recording method of the present invention can be suitably performed by the inkjet recording apparatus of the present invention, and the inkjetting step can be suitably performed by the inkjetting unit. Also, other steps can be suitably performed by other units.

<Inkjetting Step and Inkjetting Unit>

The inkjetting step is a step of jetting the inkjet ink of the present invention in the ink media set so as to record an image on a recording medium in the ink media set by applying a stimulus to the inkjet ink.

The inkjetting unit is a unit configured to jet the inkjet ink in the ink media set so as to record an image on a recording medium in the ink media set by applying a stimulus to the inkjet ink. The inkjetting unit is not particularly limited, and examples thereof include various nozzled for discharging the ink.

In accordance with the present invention, it is preferred that at least some members from among a liquid chamber, a fluid resistance portion, an oscillating plate, and a nozzle member of the ink jet head be formed from a material containing at least any of silicon and nickel.

The nozzle diameter of the ink jet nozzle is preferably 30 μm or less, and more preferably 1 μm to 20 μm.

Further, a configuration is preferred in which a sub-tank for supplying ink is provided above the inkjet head and the ink in the sub-tank be replenished via a supply tube from the ink cartridge.

Further, in the inkjet recording method of the present invention, the maximum amount of ink adhesion is preferably 8 $g/m^2$ to 20 $g/m^2$ at a resolution of 300 dpi or higher.

The stimulus can, for example, be generated by the stimulus generating unit, and the stimulus is not particularly limited and may be suitably selected according to the purpose. Examples thereof include heat, pressure, vibration and light. These may be used alone or in combination. Of these, heat and pressure are preferable.

Examples of the stimulus generating units include heaters, pressurizers, piezoelectric elements, vibration generators, ultrasonic oscillators and lights. Specific examples thereof include a piezoelectric actuator such as a piezoelectric element, a thermal actuator that utilizes phase transition caused by film boiling of a liquid by using a thermoelectric conversion element such as an exothermic resistive element, a shape-memory-alloy actuator that utilizes metal phase transition caused by temperature variations, and an electrostatic actuator using electrostatic force.

The aspect of the jetting of the inkjet ink in the ink media set is not particularly limited and varies according to the kinds of the stimulus or the like. In the case where the stimulus is "heat", there is, for example, a method in which thermal energy corresponding to a recording signal is applied to the inkjet ink in a recording head, using a thermal head or the like, bubbles are generated in the inkjet ink by the thermal energy, and the inkjet ink is discharged as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink channel in a recording head, the piezoelectric element bends, the volume of the pressure chamber decreases, and thus the inkjet ink is discharged as droplets from nozzle holes of the recording head.

It is desirable that the inkjet ink droplets jetted be, for example, $1\times10^{-15}$ $m^3$ to $40\times10^{-15}$ $m^3$ (1 pL to 40 pL) in size, 5 m/s to 20 m/s in discharge velocity, 1 kHz or greater in drive frequency and 300 dpi or greater in resolution.

The controlling unit is not particularly limited and may be suitably selected according to the purpose, as long as it can control operations of the aforementioned units. Examples thereof include apparatuses such as a sequencer and a computer.

One embodiment of inkjet recording of the present invention using the inkjet recording apparatus of the present invention will be described below with reference to the drawings.

Figure 3:
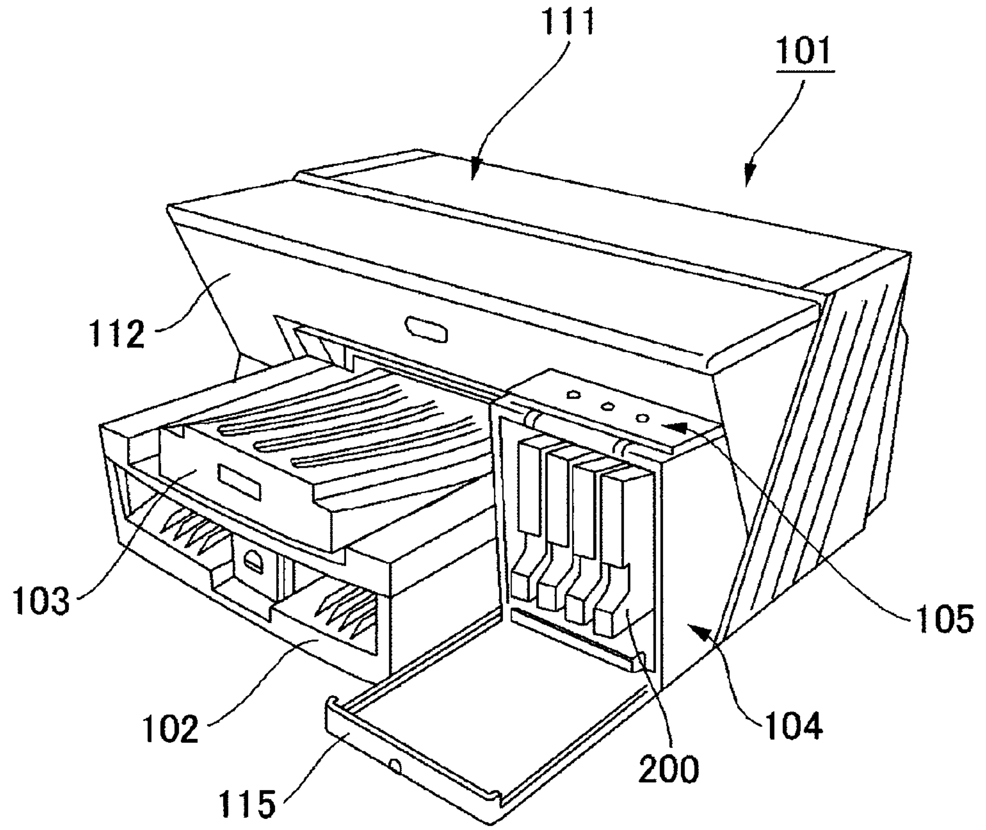
FIG. 3 shows a perspective explanatory view of an example of an ink cartridge loading unit in an inkjet recording apparatus in a state where a cover of the ink cartridge loading unit is open.

An inkjet recording apparatus shown in FIG. 3 contains an apparatus body 101, a paper feed tray 102 which serves to load paper and is mounted on the apparatus body 101, a paper discharge tray 103 which serves for stocking papers on which images have been recorded (formed) and is mounted on the apparatus body 101, an upper cover 111 and ink cartridge loading unit 104.

A control panel 105 containing control keys and a display is disposed on the upper surface of the ink cartridge loading unit 104. The ink cartridge loading unit 104 has a front cover 115 that can open and close for detachably mounting an ink cartridge 200.

Figure 4:
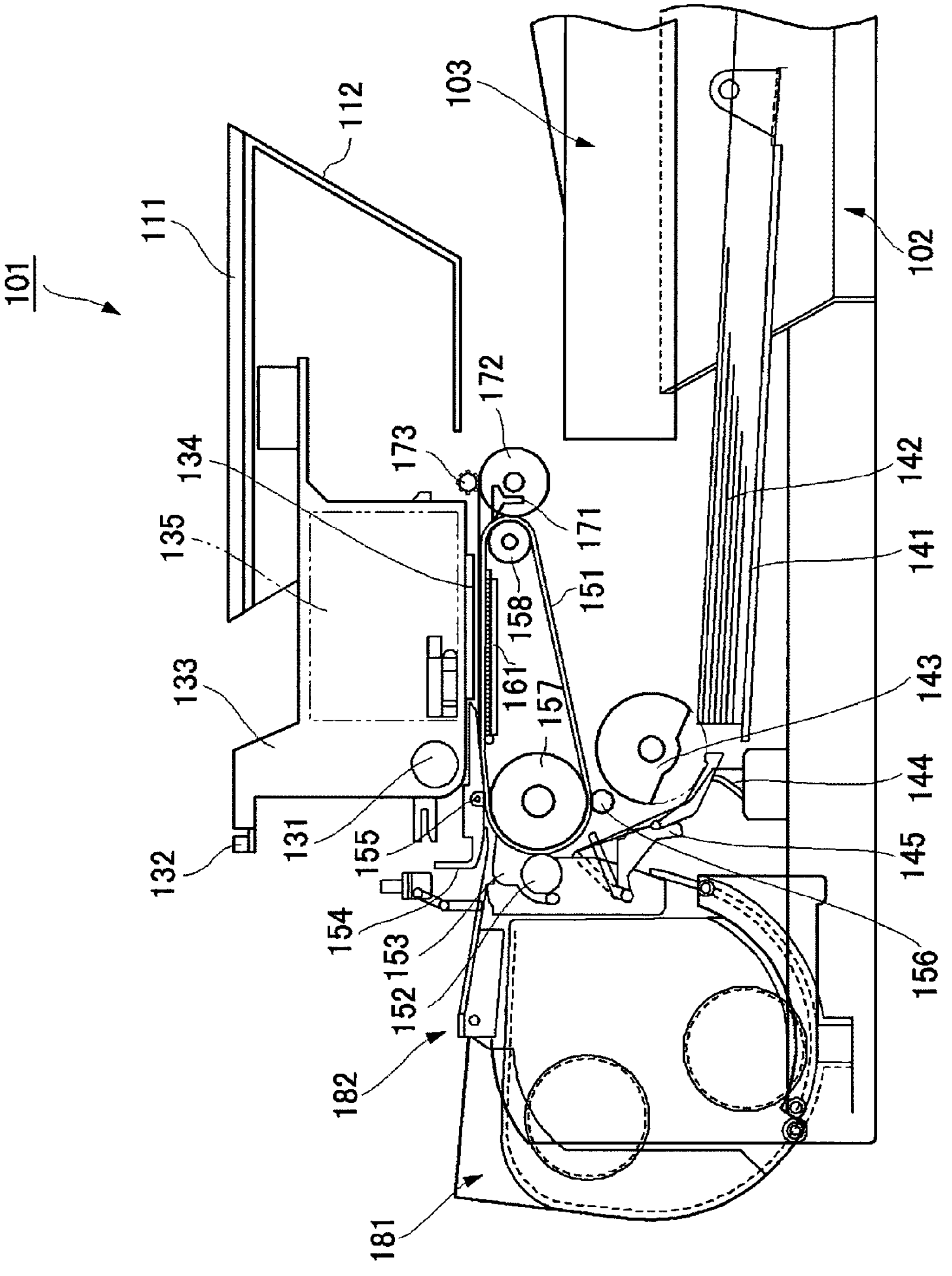
FIG. 4 shows a schematic view illustrating an example of an entire configuration of an inkjet recording apparatus.
Figure 5:
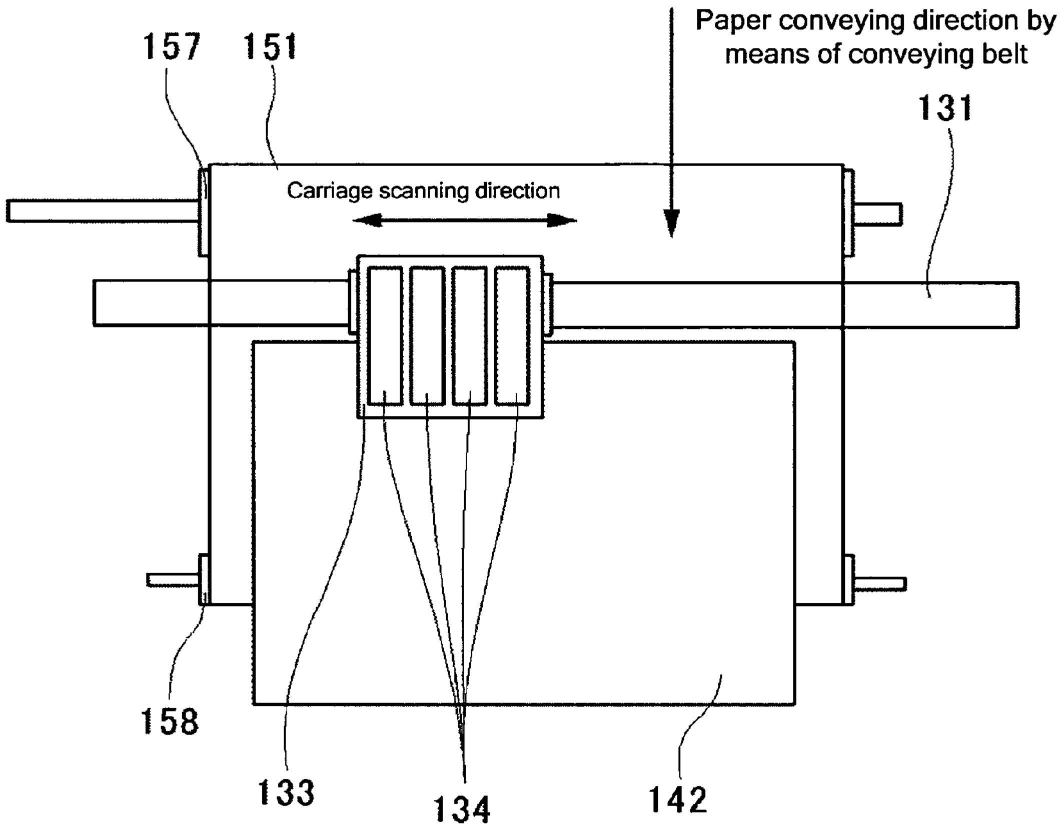
FIG. 5 shows a schematic enlarged view of an example of an inkjet head used in the present invention.

Inside the apparatus body 101, as shown in FIGS. 4 and 5, a carriage 133 is supported so that it can slide in the main scanning direction by a guide rod 131 and a stay 132 that are guide members extending in the transverse direction between left and right side plates (not shown), and the cartridge can be moved for scanning in the direction shown by an arrow in FIG. 5 by a main scanning motor (not shown).

In the carriage 133, a recording head 134 composed of four inkjet heads respectively discharging ink droplets of colors of yellow (Y), cyan (C), magenta (M), and black (Bk) is equipped so that a plurality of ink discharge ports are arranged in the direction perpendicular to the main scanning direction and the ink droplet discharge directions face downward.

A inkjet recording head constituting the recording head 134, which contains a piezoelectric actuator such as a piezoelectric element, a thermal actuator that utilizes phase transition caused by film boiling of a liquid by using a thermoelectric conversion element such as an exothermic resistive element, a shape-memory-alloy actuator that utilizes metal phase transition caused by temperature variations, or an electrostatic actuator using electrostatic forces as an energy generating unit for discharging ink, can be used.

The carriage 133 carries sub-tanks 135 for supplying with inks of each color to the recording head 134. The sub-tank 135 is supplied with the ink of the present invention in the ink media set via an ink supply tube (not shown) from the ink cartridge 200 that is loaded into the ink cartridge loading unit 104.

On the other hand, a half-moon roller (paper feed roller) 143 that can feed paper 142 sheet by sheet from a paper loading unit (pressure plate) 141 and a separation pad 144 facing the paper feed roller 143 and made from a material with a high friction coefficient are provided as a paper feed unit for feeding paper 142 that was loaded on the paper loading unit (pressure plate) 141 of the paper feed tray 102, and the separation pad 144 is biased toward the paper feed roller 143.

A conveying belt 151 for electrostatically attracting the paper 142 and conveying it, a counter roller 152 for conveying the paper 142 conveyed from the paper feed unit via a guide 145 between the counter roller and the conveying belt 151, a conveying guide 153 that converts the direction of the paper 142 that is fed substantially vertically upward by substantially 90° to align the paper with the conveying belt 151, and a tip pressurization roller 155 that is biased toward the conveying belt 151 with a pushing member 154 are provided as a conveying unit for conveying the paper 142 fed from the paper feed unit below the recording head 134. A charging roller 156 is provided as a charging unit for charging the surface of the conveying belt 151.

The conveying belt 151 is an endless belt that is stretched between a conveying roller 157 and a tension roller 158 and can rotate in the belt conveying direction. The conveying belt 151, for example, has a surface layer serving as a paper attraction surface that is formed from a resin material having a thickness of about 40 μm, which resistance is not controlled, for example, a surface layer consisting of tetrafluoroethylene-ethylene copolymer (ETFE) and a back layer (medium resistance layer, ground layer) that is made from the same material as the surface layer, which resistance is controlled by carbon. A guide member 161 is disposed opposite a printing region created by the recording head 134 on the rear side of the conveying belt 151. A separation hook 171 for separating the paper 142 from the conveying belt 151, a paper discharge roller 172, and a paper discharge roller 173 are provided as a paper discharge unit for discharging the paper 142 that has been recorded in the recording head 134. The paper discharge tray 103 is arranged below the paper discharge roller 172.

A double face paper feeding unit 181 is detachably attached to the back surface of the apparatus body 101. The double face paper feeding unit 181 captures the paper 142 returned by a reverse rotation of the conveying belt 151 to reverse the paper 142, thereby feeding the sheets again between the counter roller 152 and the conveying belt 151. It is noted that a manual paper feeding portion 182 is provided on the upper face of the double face paper feeding unit 181.

In this inkjet recording apparatus, the paper 142 is separated and fed from the paper feed part one by one. Being fed vertically, the paper 142 is guided by the guide 145 and conveyed between the conveying belt 151 and the counter roller 152. Then, it is guided by the conveying guide 153 at the leading end and is pressed against the conveying belt 151 by the leading end pressure roller 155 to change the convey direction substantially by 90°.

Meanwhile, the conveying belt 151 is charged by the charging roller 156, and the paper 142 is electrostatically adsorbed and conveyed by the conveying belt 151. Then, the recording heads 134 are driven according to image signals while the carriage 133 is moved. Ink droplets are discharged on the paused paper 142 for recording one-line. Then, the paper 142 is conveyed by a certain rate for recording the next line. Receiving a recording end signal or a signal indicating the rear end of the paper 142 has reached the recording area, the recording operation is terminated and the paper 142 is discharged to the paper output tray 103.

Then, when recording ink inside the sub-tank 135 is detected for the near end of residual amount, the recording ink is refilled at a predetermined amount from the ink cartridge 200 to the sub-tank 135.

In the inkjet recording apparatus, a housing of the ink cartridge 200 can be disassembled to exchange only an ink bag thereinside when recording ink inside the ink cartridge 200 is used up. Further, the ink cartridge 200 is able to supply the recording ink stably, even when constituted so as to fill the ink vertically from the front face. Therefore, when the ink cartridge is arranged, with the apparatus body 101 being closed above, for example, a case where the ink cartridge is contained inside a rack or an object is placed on the upper face of the apparatus body 101, the ink cartridge 200 can be exchanged easily.

In this instance, an explanation was made by referring to an example applied to a serial type (shuttle-type) inkjet recording apparatus at which the carriage scans. The inkjet recording apparatus is also applicable to a line-type inkjet recording apparatus equipped with a line-type head.

The inkjet recording apparatus and the inkjet recording method of the present invention are applicable to various types of recording by an inkjet recording method, and in particular advantageously applicable, for example, to printers, facsimile devices, copiers, and printer/fax/copier multipurpose machines for inkjet recording.

An inkjet head used in the present invention will be described below.

Figure 6:
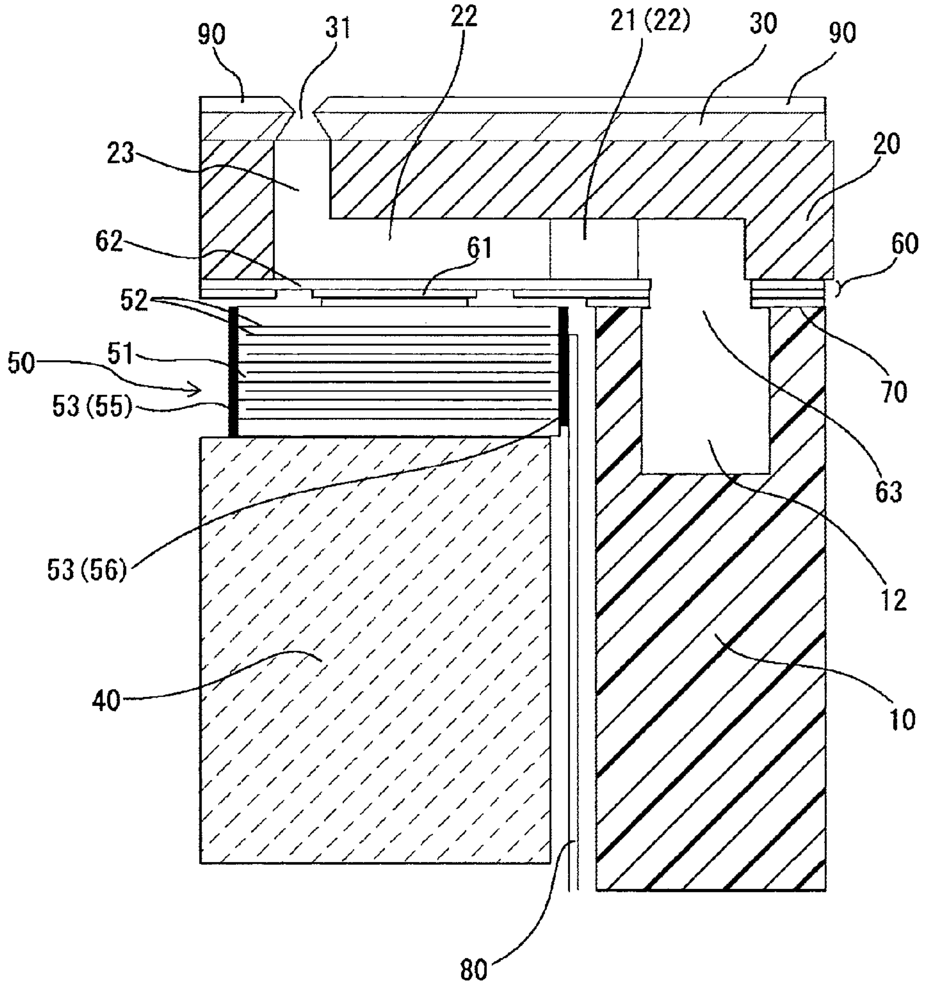
FIG. 6 shows an enlarged sectional view of an example of an inkjet head used in the present invention.
Figure 7:
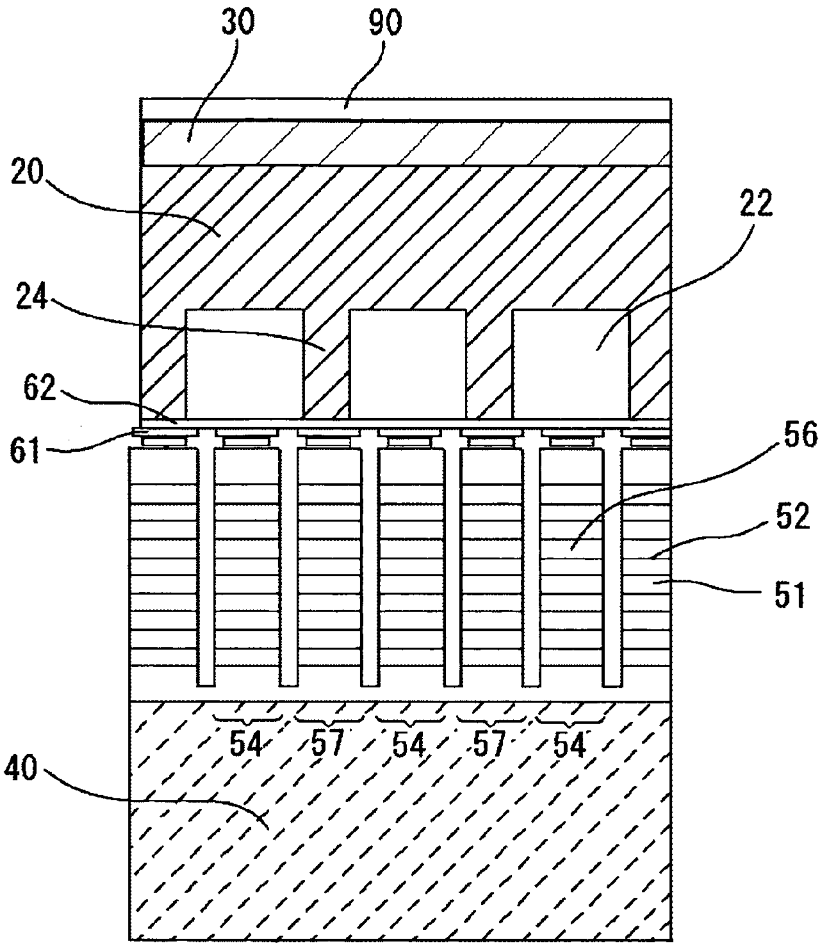
FIG. 7 shows an enlarged sectional view of an example of the main portion of an inkjet head used in the present invention.
Figure 8:
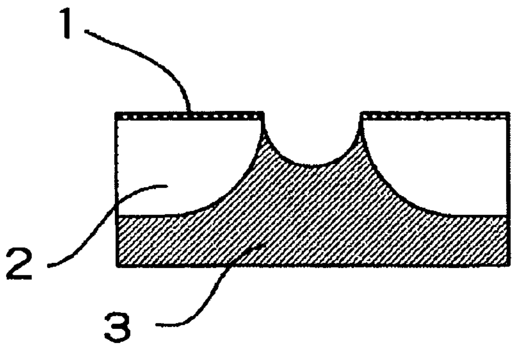
FIG. 8 shows a cross-sectional view of an example of a nozzle plate of the inkjet head used in the present invention.

FIG. 6 shows an enlarged sectional view of an example of an inkjet head used in the present invention. FIG. 7 shows an enlarged sectional view of an example of the main portion of an inkjet head used in the present invention.

The inkjet head contains a frame 10 having a cavity serving as an ink supply port and a common liquid chamber 12, a channel plate 20 having a cavity serving as a fluid resistance portion 21 and a pressurized fluid chamber 22 and a link port 23 linked to a nozzle 31, a nozzle plate 30 forming the nozzle 31, an oscillation plate 60 having a convex portion 61, a diaphragm portion 62 and an ink inflow port 63, a laminated piezoelectric element 50 joined with an adhesive layer 70 to the oscillation plate 60, and a base 40 that fixes the laminated piezoelectric element 50. The base 40 is made from a barium titanate ceramic and has two laminated piezoelectric elements 50 disposed in row and joined thereto.

The laminated piezoelectric element 50 is obtained by alternately laminating piezoelectric layers 51 of lead zirconium titanate (PZT), each having a thickness of 10 μm to 50 μm, and internal electrode layers 52 composed of silver-palladium (AgPd), each layer having a thickness of several micrometers. The internal electrode layers 52 are connected to the external electrodes 53 at both ends.

The laminated piezoelectric element 50 is split in a comb-tooth manner by half-cut dicing, and each section is used as a drive portion 56 and a support portion 57 (non-drive portion) (see FIG. 7).

The external side of one of two external electrodes 53 is restricted in length by machining such as notching so that it can be split by half-cut dicing, and the sections obtained serve as a plurality of individual electrodes 54. The other side is conductive, without being split by dicing, and serves as a common electrode 55.

An FPC 80 is joined by soldering to individual electrodes 54 of the drive portion. Further, in the common electrode 55, an electrode layer is provided at the end portion of the laminated piezoelectric element 50 and bent to joint to the ground electrode of the FPC 80. A Driver IC (not shown) is mounted on the FPC 80, and drive voltage application to the drive portion 56 is controlled thereby.

The oscillation plate 60 is formed from the thin-film diaphragm portion 62, the island-shaped convex portion (island portion) 61 that is formed in the central zone of the diaphragm portion 62, joined to the laminated piezoelectric element 50 and serves as the drive portion 56, a thick-film portion including a beam for connection to the support portion (not shown), and an opening serving as the ink inflow port 63, by two-layer stacking a Ni plated film obtained by an electroforming method. The thickness of the diaphragm portion is 3 μm and the width is 35 μm (one side).

Joining between the island-shaped convex portion 61 of the oscillation plate 60 and the drive portion 56 of the laminated piezoelectric element 50, and between the oscillation plate 60 and the frame 10 is performed with the patterned adhesive layer 70 including a gap material.

A silicon single-crystal substrate is used for the channel plate 20, and the plate is patterned by an etching method to form a cavity serving as the fluid resistance portion 21 and pressurized fluid chamber 22 and a through port serving as the link port 23 in a position corresponding to the nozzle 31.

A portion remaining after etching serves as a partition wall 24 of the pressurized fluid chamber 22. Further, a portion of decreased etching width is provided in the head, and this portion serves as the to fluid resistance portion 21.

The nozzle plate 30 is formed of a metal material, e.g., of a Ni plated film obtained by electroforming and has a large number of nozzles 31 serving as fine discharge ports for jetting inkjet ink droplets. The nozzles 31 are formed to have a horn-like inner (internal) shape (may also have a substantially cylindrical rod-like or barrel-like shape). The diameter of the nozzle 31 is 20 μm to 35 μm as a diameter on the ink droplet discharge port. The nozzle pitch in each row is 150 dpi.

A frame 10 having a cavity serving as an ink supply port and a common liquid chamber 12 is produced by resin molding.

In the inkjet head of the above-descried configuration, when a drive waveform (a pulsed voltage of 10 V to 50 V) is applied to the drive portion 56 according to a recording signal, a displacement in the lamination direction is induced in the drive portion 56, the pressurized liquid chamber 22 is pressurized via the nozzle plate 30, the pressure therein is increased, and an ink droplet is discharged from the nozzle 31.

As the discharge of ink droplet is completed, the ink pressure inside the pressurized liquid chamber 22 is reduced, a negative pressure is generated inside the pressurized liquid chamber 22 by the inertia of ink flow and discharge process of the drive pulse, and then a transition is made to an ink filling step. At this time, the ink supplied from the ink tank flows into the common liquid chamber 12, and the pressurized liquid chamber 22 is filled with the ink from the common liquid chamber 12 via the ink inflow port 63 and through the fluid resistance portion 21.

The fluid resistance portion 21 effectively attenuates residual pressure oscillations after discharging and also creates resistance to a refill by surface tension. By appropriately selecting the fluid resistance portion, it is possible to attain a balance between the attenuation of residual pressure and refill, and to shorten time (drive period) to the next ink droplet discharge operation.

<Explanation of Relationship Between Nozzle Plate, Ink and Medium>

When an ink is used that has a comparatively low surface tension, such as the ink used in the image forming method of the present invention, it is preferred that the nozzle plate excel in water repellency and ink repellency. This is because by using the nozzle plate that excels in water repellency and ink repellency, it is possible to form normally a meniscus even of the ink with a low surface tension, thereby enabling effective formation of ink droplets. When the meniscus is normally formed, the ink is prevented from stretching unidirectionally during spraying. As a result, the ink spraying trajectory is hardly curved and an image having an accurate dot position can be obtained.

Further, when printing is performed on a medium with low absorption ability, as the medium (paper) used in the ink media set, the image quality strongly depends on the dot position accuracy. In other words, because the ink spreads poorly on the medium having low absorption ability, when the dot position accuracy decreases slightly, areas in which the ink fails to fill, that is, white spots appear on the medium. These areas cause uneven image density and decrease of image density, thereby causing poor image quality.

However, the inkjet head used in the present invention can realize a high dot position accuracy even if ink having low surface tension is used, by which the ink successfully fills a recording medium having low absorption, thereby obtaining a print having high image quality free of uneven image density or poor image density.

<Ink Repellent Layer>

(Surface Roughness)

The surface roughness Ra of the ink repellent layer is preferably 0.2 μm or less. By making the surface roughness Ra of 0.2 μm or less, it is possible to reduce the amount of wiping residues during wiping.

FIGS. 8, 9A to 9C and 10A to 10C are cross-sectional views of the nozzle plate of the inkjet head used in the present invention.

In the present embodiment, a nozzle plate 2 which is a base material of the inkjet head produced by Ni electroforming, an ink repellent layer 1 is formed on the base material, wherein the ink repellent layer 1 is a silicone resin film having a thickness of 0.1 μm or more and preferably has a surface roughness (Ra) of 0.2 μm or less. The ink repellent layer 1 preferably has a thickness of 0.5 μm or more.

Figure 9A:
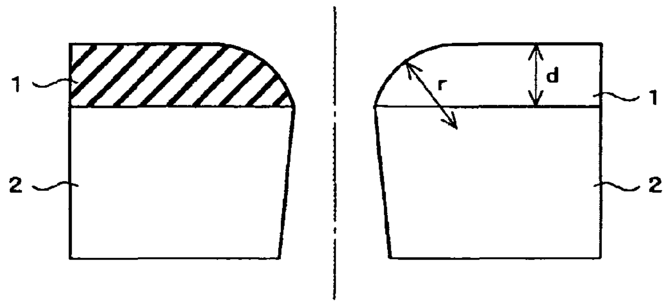
FIG. 9A shows another cross-sectional view of an example of a nozzle plate of the inkjet head used in the present invention (first).
Figure 9B:
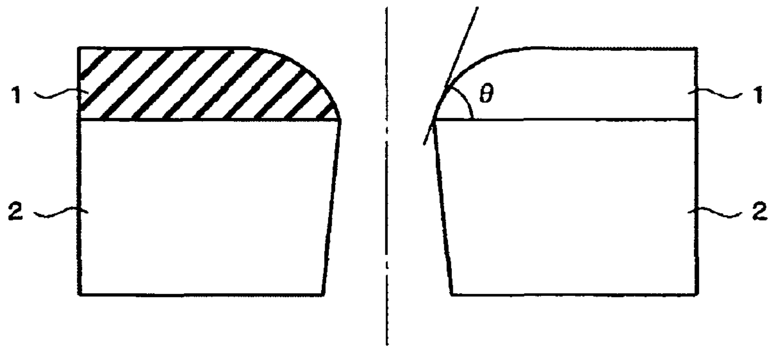
FIG. 9B shows another cross-sectional view of an example of a nozzle plate of the inkjet head used in the present invention (second).
Figure 9C:
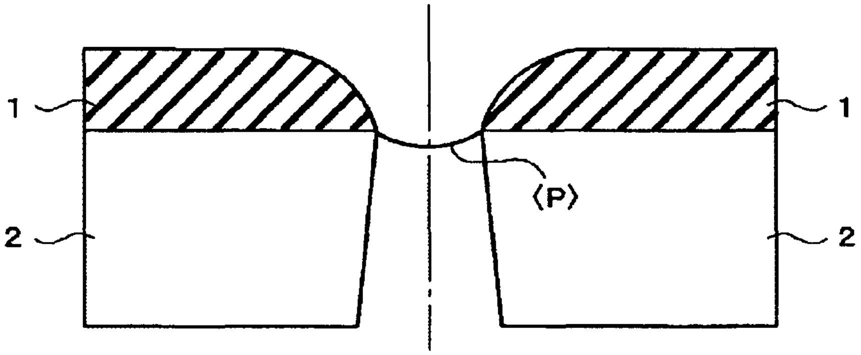
FIG. 9C shows another cross-sectional view of an example of a nozzle plate of the inkjet head used in the present invention (third).

During filling with an ink, as shown in FIG. 9C, a meniscus (liquid surface) P is formed in a boundary portion of the ink repellent layer 1 composed of a silicon resin film and the nozzle plate 2.

(Round Shape)

The ink repellent layer is so formed that a cross section area in a plane perpendicular to a central line of an opening of the ink repellant layer that is formed on the surface provided with openings (nozzles) for ink discharge in the inkjet head in the vicinity of the openings increases successively with distance from the surface of the base material.

The ink repellent layer preferably has a curved surface shape in the vicinity of the opening.

Further, the curvature radius of the curve of the ink repellent layer in the vicinity of the opening in the cross section of the plane including the central line of the opening is preferably equal to or more than the thickness of the ink repellent layer.

Further, it is also preferred that the curve of the ink repellent layer from the edge of the opening to the vicinity of the opening in the cross section of the plane including the central line of the opening be a substantially circular-arc curve, and the curvature radius of the circular arc is preferably equal to or more than the thickness of the ink repellent layer.

A tangent line to the ink repellent layer passing through the edge of the opening in the cross section of the plane including the central line of the opening preferably forms an angle of less than 90 degrees with the nozzle member surface including the edge.

The opening of the nozzle plate 2 is so provided that the cross section formed by the plane perpendicular to the central line represented by a dot-dash line in FIGS. 9A to 9C has a substantially round shape with this central line as a center. Further, the ink repellent layer 1 formed on the ink discharge surface in the nozzle plate 2 is formed such that the cross section area of the opening portion formed by the plane perpendicular to the central line increases successively with distance from the nozzle plate 2.

More specifically, as shown in FIG. 9A, in the open portion of the ink repellent layer 1, the curve from the opening edge of the nozzle plate 2 in the vicinity of the opening has a round shape with a curvature radius "r". This curvature radius "r" is preferably equal to or more than the thickness "d" of the ink repellent layer 1 outside the zone in the vicinity of the open portion.

The thickness "d" is a thickness of ink repellent layer 1 outside the round portion that is the open portion and preferably is the maximum thickness of the ink repellent layer.

Thus, the open portion of the ink repellent layer 1 that is connected to the opening of the nozzle plate 2 has a shape without sharp edges (smooth curve without sharp portions) and is a curve having no protruding zones. Therefore, when it is wiped with a wiper formed from a material such as rubber, the ink repellent layer 1 can be prevented from being separated from the nozzle plate 2 as a result of sharp portions being caught by the wiper.

Further, as shown in FIG. 9B a tangent line to the ink repellent layer 1 passing through the edge of the opening in the cross section along the plane including the central line of the opening of the nozzle plate 2 preferably forms an angle θ of less than 90 degrees with the surface of the nozzle plate 2 including the opening edge of the nozzle plate 2 connected to the edge of the opening portion.

Where the angle θ between the tangent line to the ink repellent layer 1 at the edge of the opening portion and the surface of the nozzle plate 2 is less than 90 degrees, as shown in FIG. 9C, a meniscus (liquid surface) P is formed with good stability in the boundary portion of the ink repellent layer 1 and the nozzle plate 2, and the possibility of the meniscus P being formed in the portion can be greatly reduced.

As a result, because the meniscus formation surface is stabilized, ink discharge stability during image formation in the image forming apparatus using the inkjet head including the nozzle plate 2 can be improved.

A liquid silicone resin curable at room temperature is preferably used as the silicone resin used in the present embodiment and a resin of a type such that curing is accompanied by a hydrolysis reaction is even more preferred. In the below-described examples, SR2411 (manufactured by Dow Corning Toray Co., Ltd.) is used.

Table 1 below shows the results obtained by evaluating the shape of the ink repellent layer 1 from the opening edge of the nozzle plate 2 to the vicinity of the opening edge in the inkjet head of the present embodiment and the occurrence of ink residue around the nozzle, edge separation, and discharge stability.

TABLE 1

| Edge shape | | Ink residue | Edge separation | Discharge stability |
|---|---|---|---|---|
| Sharp tip is present | | Some ink residue occur | Occurs | Good |
| No sharp tip (round shape) | $\theta \leqq 90°$ | None | None | Good |
| | $\theta > 90°$ | None | None | Poor |
| | $r \geqq d$ | None | None | Good |
| | $r < d$ | None | Some edge separation occur | Poor |

The results shown in Table 1 demonstrate that where a substantially sharp tip is contained in the edge portion (in the vicinity of the opening portion edge) of the ink repellent layer 1, ink residue is observed around the nozzle and edge separation occurs due to wiping.

Figure 10A:
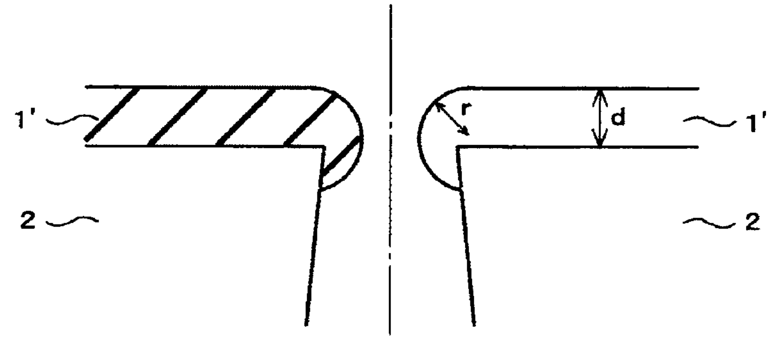
FIG. 10A shows a still another cross-sectional view of an example of a nozzle plate of an inkjet head used in the present invention (first).
Figure 10B:
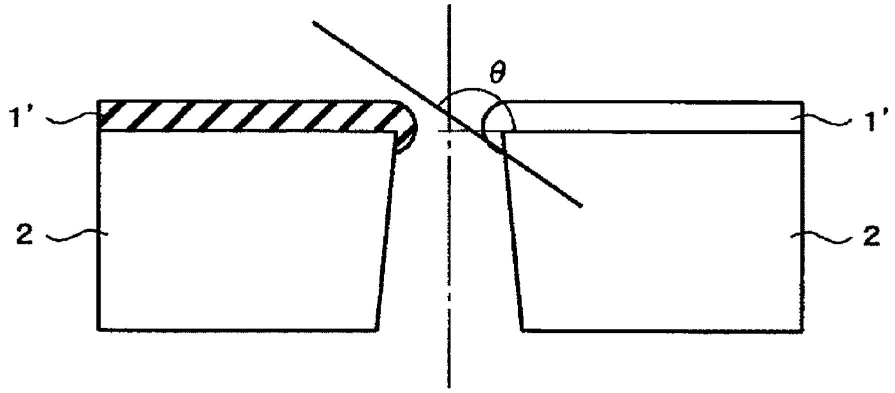
FIG. 10B shows a still another cross-sectional view of an example of a nozzle plate of an inkjet head used in the present invention (second).

With the round shape, no ink residues occur, for the purpose of comparison in the configuration with r<d as shown by an example in FIG. 10A, some edge separation is observed, and in the configuration with θ>90°, as shown in FIG. 10B, discharge of ink droplets is unstable.

Figure 10C:
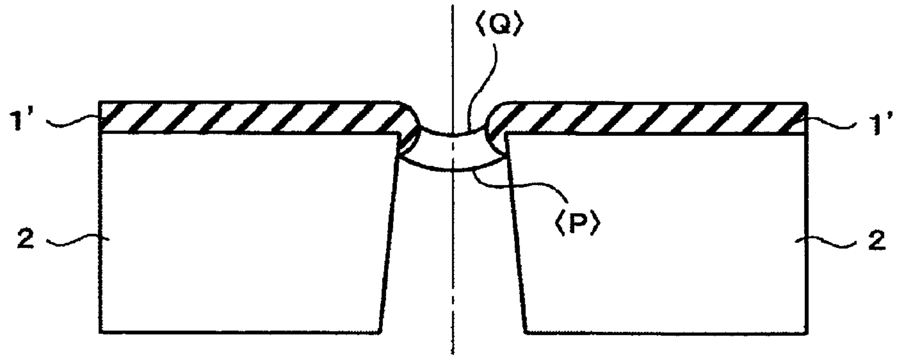
FIG. 10C shows a still another cross-sectional view of an example of a nozzle plate of an inkjet head used in the present invention (third).

Further, when r<d and θ>90°, as shown in FIG. 10C, a meniscus (liquid level) P can be formed in the boundary portion of the ink repellent layer 1 and nozzle plate 2 during ink filling and a meniscus Q can be formed in the convex portion (a portion in which the area of the cross section perpendicular to the central line in the open portion is the smallest) facing the center of the open portion of the ink repellent layer 1'. As a result, ink discharge stability may sometimes vary during image recording in the inkjet recording apparatus using the inkjet head including the nozzle plate 2.

A method for producing a nozzle member of the inkjet head of the above-described embodiment will be described below.

Figure 11:
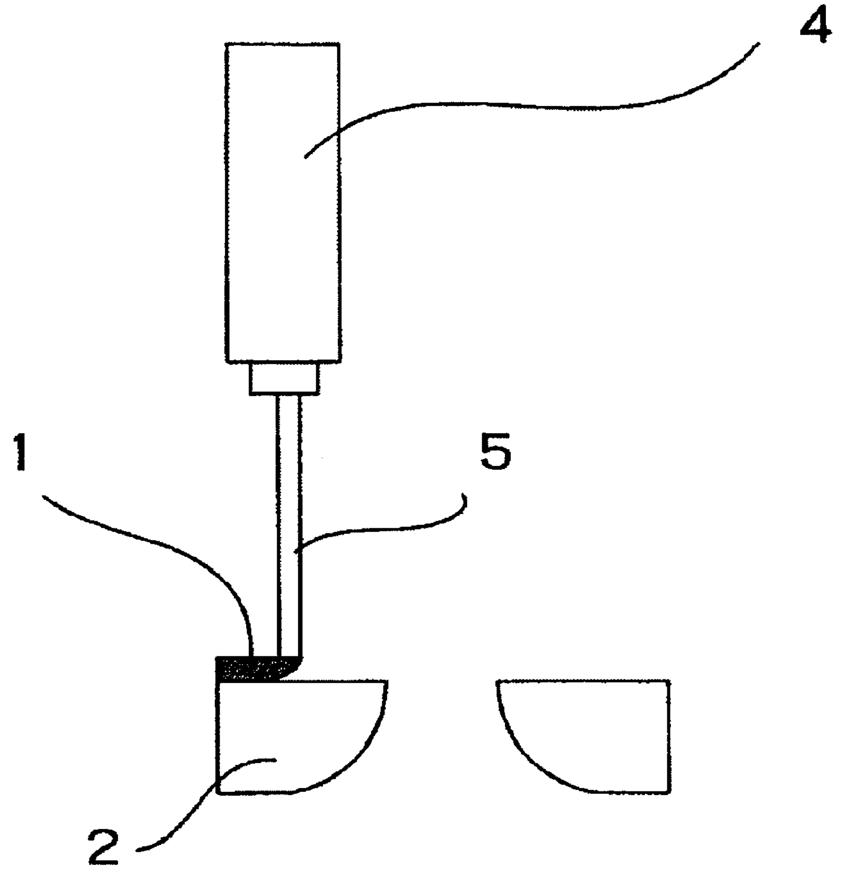
FIG. 11 shows a configuration in which an ink repellent layer is formed by coating a silicone resin with a dispenser, according to an embodiment of the present invention.

FIG. 11 shows a configuration in which an ink repellent layer 1 is formed by coating a silicone resin with a dispenser 4, according to the present embodiment.

The dispenser 4 is disposed for coating a silicone solution on the ink discharge surface side of the nozzle 2 produced by Ni electroforming, and the ink repellent layer 1 (silicone resin film) can be selectively formed on the ink discharge surface of the nozzle plate 2, as shown in the above-described FIG. 8 and FIGS. 9A to 9C, by scanning the dispenser 4, while discharging the silicone solution from the tip of a needle 5 and maintaining a predetermined constant spacing between the nozzle plate 2 and the tip of the needle 5.

The silicone resin used in the present embodiment is a silicone resin curable at normal temperature (SR2411 manufactured by Dow Corning Toray Co., Ltd.), having a viscosity of 10 mPa·s. A certain accumulation of the silicone is observed in the nozzle hole and the back surface of the nozzle plate. The ink repellent layer 1 (silicone resin film) that is selectively formed in the above-described manner has a thickness of 1.2 μm and a surface roughness (Ra) of 0.18 μm.

Figure 12A:
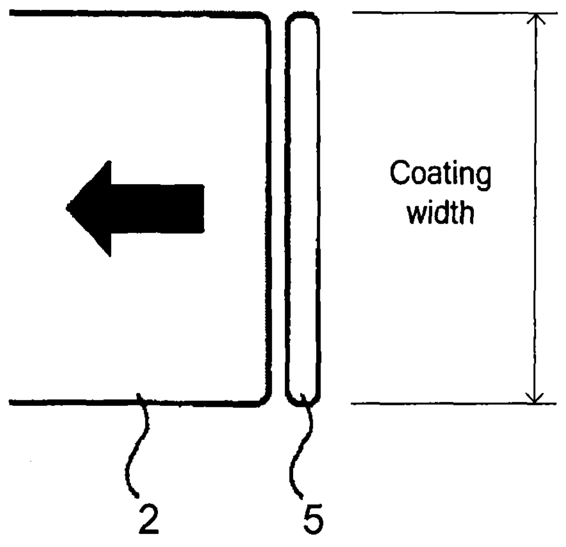
FIG. 12A shows a coating operation using a dispenser according to an embodiment of the present invention (first).

The coating orifice at the tip of the needle 5 of the present embodiment, as shown in FIG. 12A, is ensured to have a width equal to the coating width of the nozzle plate 2 which is the coating object. As a result, coating of the entire coating object can be completed by scanning the dispenser 4 once in the coating direction.

Figure 12B:
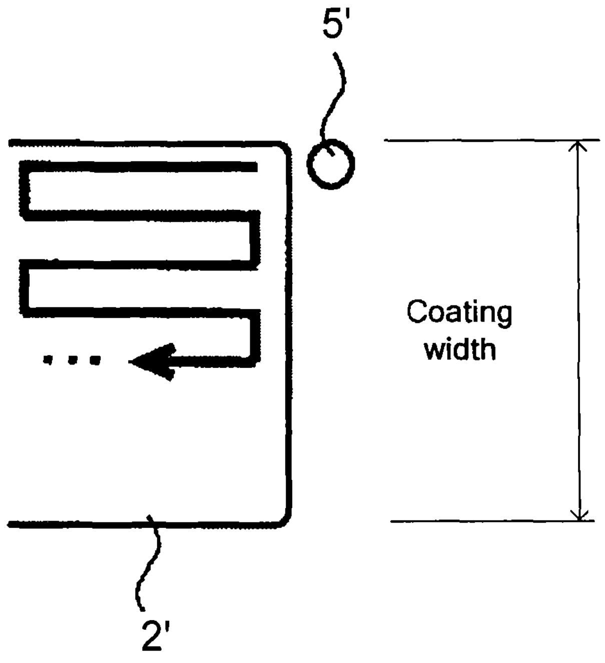
FIG. 12B shows a coating operation using a dispenser according to an embodiment of the present invention (second).

Thus, the scanning direction for coating operation can be only one direction, and as shown in FIG. 12B the changing the direction to perform scanning in the opposite direction can be eliminated.

Here, as shown in FIG. 12B, the tip of the conventional needle 5 is much narrower than the coating width on the nozzle plate 2. Therefore, in order to complete scanning of the entire scanning object, it is necessary to perform scanning in a plurality of directions by changing the scanning direction for the coating operation by 90°, shifting the tip of the needle, and performing scanning in the opposite direction. As a result, a coating film having a uniform thickness is difficult to obtain on the entire coating object.

According to the present embodiment, the width of the coating orifice at the tip of the needle 5 is ensured to be equal to the coating width on the nozzle plate 2 which is the coating object, whereby a uniform coating thickness can be obtained over the entire coating object and the surface of the nozzle plate can be finished with good accuracy.

Figure 13:
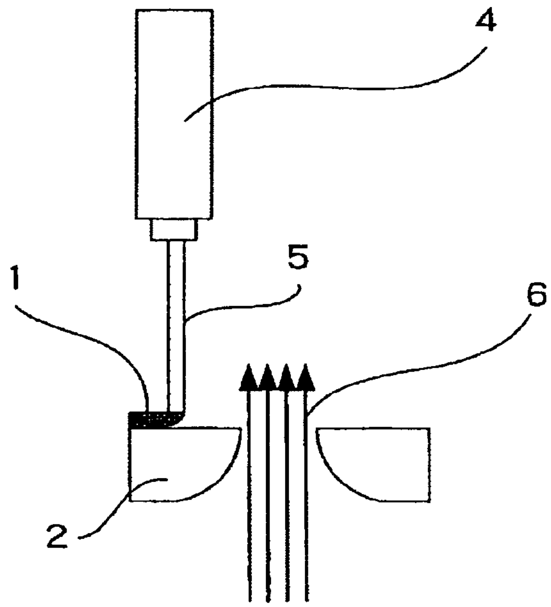
FIG. 13 shows a coating orifice at a tip of a needle according to the present invention.

FIG. 13 shows a coating operation using the dispenser 4 of the present embodiment. The basic configuration is identical to that shown in FIG. 11, but a silicone solution is coated, while spraying gas 6 from a nozzle hole (opening) of the nozzle plate 2. As the gas 6, a variety of gases which do not easily participate in chemical reaction with silicone to be coated may be used. For example, air can be used. By performing coating, while spraying the gas 6 from the nozzle hole, it is possible to form the ink repellent layer 1 (silicone resin film) only on the nozzle surface, excluding the nozzle hole of the nozzle plate 2.

Figure 14:
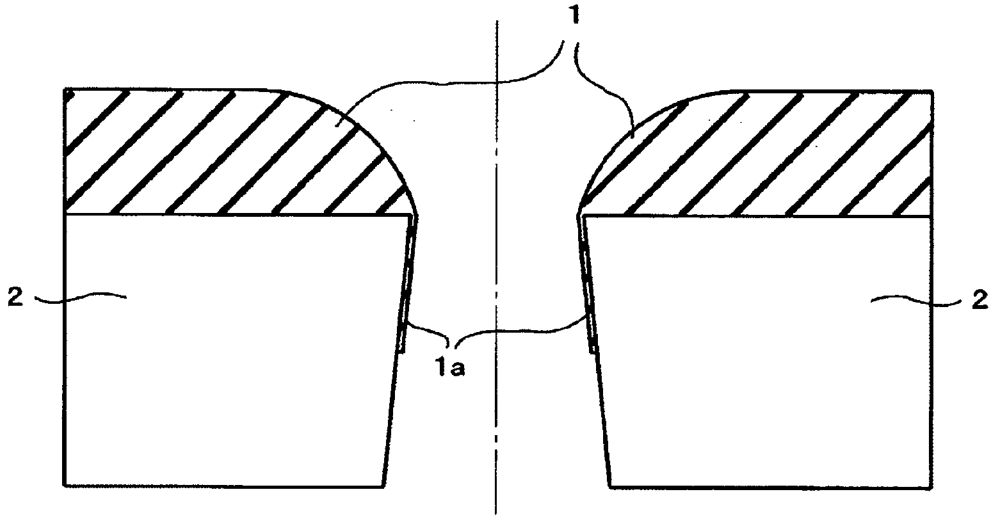
FIG. 14 shows a still further other cross-sectional view of an example of a nozzle plate of an inkjet head.

Further, when coating is performed by using a similar silicone solution, but without spraying the gas 6 as described above, and then spraying the gas 6 from the nozzle 2 after the silicone solution has penetrated to the predetermined depth, it is possible to form an ink repellent layer consisting of a silicone resin to a desired depth (for example, about several micrometers) on the inner wall of the nozzle, as shown in FIG. 14.

Thus, in addition to the above-described ink repellent layer 1 on the ink discharge surface, a very thin ink repellent layer 1*a* (ink repellent layer on the inner wall of the opening) can be formed to the predetermined depth from the opening edge of the nozzle plate 2.

Wiping is performed using an EPDM rubber (rubber hardness 50°) with respect to the ink repellent layer 1 of the nozzle plate produced in the above-described manner. The results obtained demonstrated that the ink repellent layer 1 of the nozzle plate can maintain good ink repellency with respect to 1,000 times of wiping. The nozzle member having the ink repellent layer formed thereof was immersed into ink at 70° C. for 14 days. The results obtained demonstrated that unchanged ink repellency could be maintained even after the immersion.

(Thickness of Ink Repellent Layer)

Figure 15:
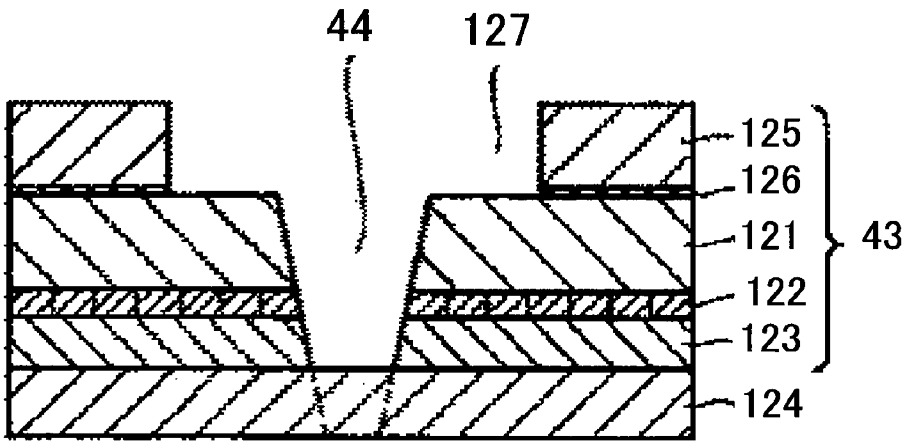
FIG. 15 shows an embodiment of an example of an inkjet head used in the present invention.

FIG. 15 shows an example of an inkjet head used in the present invention and shows a state where a nozzle hole is formed by an excimer laser processing. A nozzle plate 43 is obtained by joining a resin member 121 and a high-rigidity member 125 with a thermoplastic adhesive 126. A $SiO_2$ thin-film layer 122 and a fluorine-containing water-repellent layer 123 are successively laminated on the surface of the resin member 121, a nozzle hole 44 of a required diameter is formed in the resin member 121, and a nozzle linking orifice 127 that is linked to the nozzle hole 44 is formed in the high-rigidity member 125. The $SiO_2$ thin-film layer 122 is formed by a method that produces a relatively small amount of heat, that is, at a temperature within a range in which the resin member is not thermally affected. More specifically, the preferred methods include sputtering, ion-beam vapor deposition, ion plating, CVD (chemical vapor deposition), and P-CVD (plasma chemical vapor deposition).

From the standpoint of process time and material cost, it is preferred that the thickness of the $SiO_2$ thin-film layer 122 be the minimum required thickness within a range in which the adhesive strength is ensured. This is because if the thickness is too large, it sometimes hinders the formation of nozzle hole with the excimer laser. Thus, in some cases part of the $SiO_2$ thin-film layer 122 is not sufficiently processed and an unprocessed section remains even if a good nozzle hole shape is obtained in the resin member 121. Therefore, it can be said that the suitable thickness is within a range of 1 Å to 300 Å (0.1 nm to 30 nm) in which good adhesive strength can be ensured and no $SiO_2$ thin-film layer 122 remains during excimer laser processing. An even more preferred range is 10 Å to 100 Å (1 nm to 10 nm). Test results demonstrated that even at a $SiO_2$ film thickness of 30 Å (3 nm) sufficient adhesivity is obtained and no problems are associated with excimer laser processability. Further, extremely small processing residues are observed at a film thickness of 300 Å (30 nm), and rather large processing residues are generated when the thickness exceeds 300 Å (30 nm), these residues creating an abnormal nozzle shape that cannot be used.

<Material of Ink Repellent Layer>

For material of the ink repellent layer, various materials can be used as long as the material repels water. Examples thereof include fluorine water repellent materials, and silicone water repellent materials.

With respect to the fluorine water repellent materials, various material are known, however, here, necessary water repellency is obtained by depositing a mixture of perfluoropolyoxethane and modified perfluoropolyoxethane (trade name: OPTOOL DSX manufactured by Daikin Industries, Ltd.) to a thickness of 1 Å to 30 Å (0.1 nm to 3 nm). Experimental results reveal that there are no difference in water repellency and wiping endurance for the Optool DSX films having a thickness of 10 Å (1 nm), 20 Å (2 nm), and 30 Å (3 nm).

Thus, the thickness of the fluorine water repellent layer is more preferably 1 Å to 20 Å (0.1 nm to 2 nm) in view of cost. A pressure sensitive adhesive tape 124 in which an adhesive material is applied to a resin film is attached to a surface of the fluorine water repellent layer 123 and assists an excimer laser process.

Examples of silicone water repellent materials are as follows:

Liquid silicone resins or elastomers curable at room temperature are known as silicone water-repellent materials, and an ink repellent layer is preferably formed by coating one of them on the base material surface and allowing it to stand in the air at room temperature to induce polymerization for curing.

Liquid silicone resins or elastomers curable by heating are also known as silicone water-repellent materials, and an ink repellent layer is preferably formed by coating one of them on the base material surface and curing by heating.

Liquid silicone resins or elastomers curable by UV radiation are also known as silicone water-repellent materials, and an ink repellent layer is preferably formed by coating one of them on the base material surface and curing by irradiation with UV light.

The viscosity of the silicone water repellent material is preferably 1,000 cp (centipoises) or less.

Figure 16:
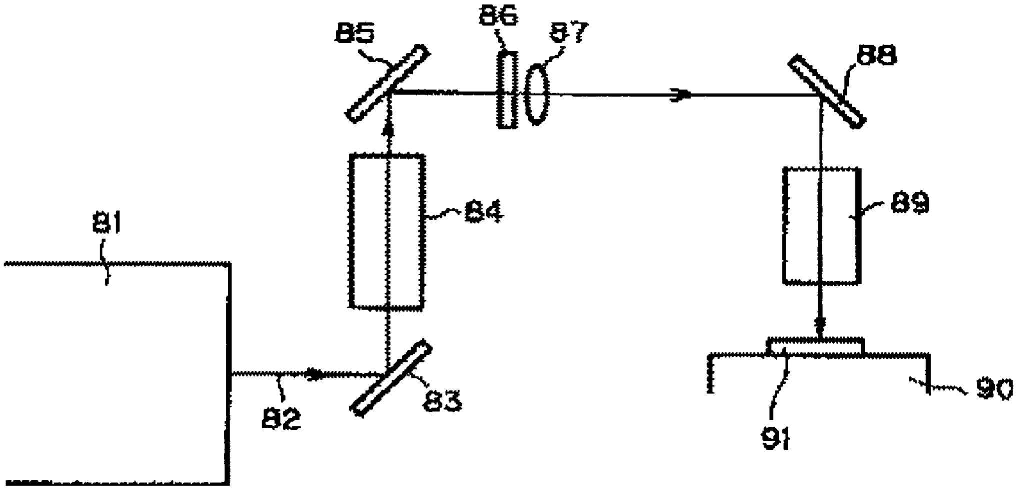
FIG. 16 shows an example of a configuration of an excimer laser processing apparatus for use in nozzle hole formation.

FIG. 16 shows an example of a configuration of an excimer laser processing apparatus for use in nozzle hole formation. An excimer laser beam 82 emitted from a laser generator 81 is reflected by mirrors 83, 85, 88 and guided to a processing table 90. A beam expander 84, a mask 86, a field lens 87, and an image-forming optical system 89 are provided in the predetermined positions of an optical path by which the laser beam 82 reaches the processing table 90 in order to obtain a laser beam optimal for a specific processing object. A processing object (nozzle plate) 91 is placed on the processing table 90 and receives the laser beam. The processing table 90 is a well-known XYZ table that is configured, if necessary, so that the processing object 91 can be moved to be irradiated with the laser beam in a desired position. The use of an excimer laser is explained herein, but a variety of lasers can be used, provided that they are short-wavelength UV lasers enabling the ablation processing.

FIG. 17A to FIG. 17F schematically show a process for producing a nozzle plate in the method for producing the inkjet head used in the present invention.

Figure 17A:
FIG. 17A shows a material serving as a base material for a nozzle forming member.

FIG. 17A shows a material serving as a base material for a nozzle forming member. Here, for example, a powder-free film of Kapton (trade name), which is a polyimide film manufactured by DuPont, is used as the resin film 121. In a typical polyimide film, particles such as $SiO_2$ (silica) are added to the film material to improve handleability (sliding ability) in a roll film handling apparatus. When a nozzle hole forming process is carried out with an excimer laser, an abnormal nozzle shape is sometimes obtained because the $SiO_2$ (silica) particles are difficult to process with the excimer laser. Therefore, in the present invention, a film, to which $SiO_2$ (silica) particles have not been added, is used.

Figure 17B:
FIG. 17B shows a step in which the $SiO_2$ thin-film layer is formed on a surface of a resin film.

FIG. 17B shows a step in which the $SiO_2$ thin-film layer 122 is formed on the surface of the resin film 121. A sputtering method performed in a vacuum chamber is suitable for forming the $SiO_2$ thin-film layer 122. The appropriate film thickness of the thin-film layer 122 is several angstroms to 200 Å (20 nm). Here, the $SiO_2$ thin-film layer 122 having a thickness of 10 Å to 50 Å (1 nm to 5 nm) is formed. Using a sputtering method in which Si is sputtered and then a $SiO_2$ film is formed by bombarding the Si surface with $O_2$ ions is effective in terms of improving the adhesive strength of the $SiO_2$ film to the resin film 121, obtaining a homogeneous dense film, and improving wiping endurance of the water repellent film.

Figure 17C:
FIG. 17C shows a step in which a fluorine-containing water repellent agent is coated over a surface of a $SiO_2$ thin-film layer.

FIG. 17C shows a step in which a fluorine-containing water repellent agent 123*a* is coated over a surface of a $SiO_2$ thin-film layer 122. A method employing a spin coater, a roll coater, screen printing, or a spray coater can be used for coating the fluorine-containing water repellent agent, but a method for forming the film by vapor deposition is more effective because it improves adhesivity of the water-repellent film. An even better effect can be obtained with vacuum deposition by performing vacuum deposition in a vacuum chamber directly after forming the $SiO_2$ thin-film layer 122 as shown in FIG. 17B. In the conventional process, the workpiece is removed from the vacuum chamber once the $SiO_2$ thin-film layer 122 has been formed. As a result, impurities or the like adhere to the workpiece surface, thereby degrading adhesion. A variety of materials are known as fluorine-containing water repellent materials. Here, water repellency necessary with respect to the ink can be obtained by using perfluoropolyoxetane, modified perfluoropolyoxetane, a mixture thereof as a fluorine amorphous compound. The aforementioned Optool DSX, manufactured by Daikin Industries, Ltd. is called "an alkoxysilane-terminated modified perfluoropolyether."

Figure 17D:
FIG. 17D shows a step of allowing the deposited water repellent film to stand in the air.

FIG. 17D shows a step of allowing the deposited water repellent film to stand in the air. With this process, the fluorine-containing water-repellent agent 123*a* and the $SiO_2$ thin-film layer 122 are chemically bonded via moisture present in the air and the fluorine-containing water-repellent layer 123 is formed.

Figure 17E:
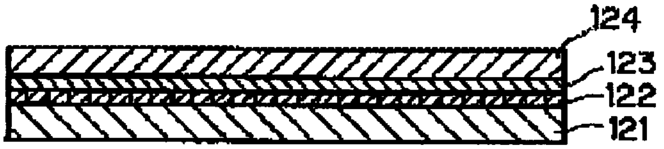
FIG. 17E shows a step of attaching an adhesive tape.

FIG. 17E shows a step of attaching the adhesive tape 124. The adhesive tape 124 is attached on the surface coated with the fluorine-containing water repellent layer 123. The adhesive tape 124 is attached so that no gas bubbles are generated. Where gas bubbles are generated, quality of the nozzle hole opened in a location where a gas bubble is present is sometimes degraded by the adhesion of foreign matter during processing.

Figure 17F:
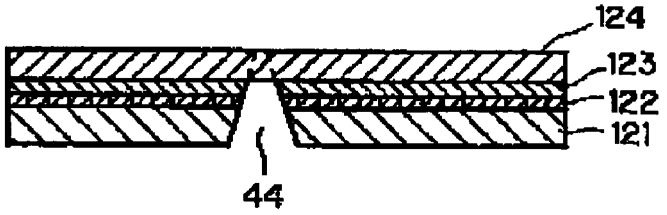
FIG. 17F shows a step of forming a nozzle hole.

FIG. 17F shows a step of forming the nozzle hole 44. In this step the nozzle hole 44 is formed by irradiating with an excimer laser from the side of the polyimide film 121. After the nozzle hole 44 has been formed, the adhesive tape 124 is peeled off. Here, the explanation of the high-rigidity member 125 used to improve the rigidity of the nozzle plate 43 that is explained with reference to FIG. 15 is omitted, but where the high-rigidity member is applied, the step is implemented between the step shown in FIG. 17D and the step shown in FIG. 17E.

Figure 18:
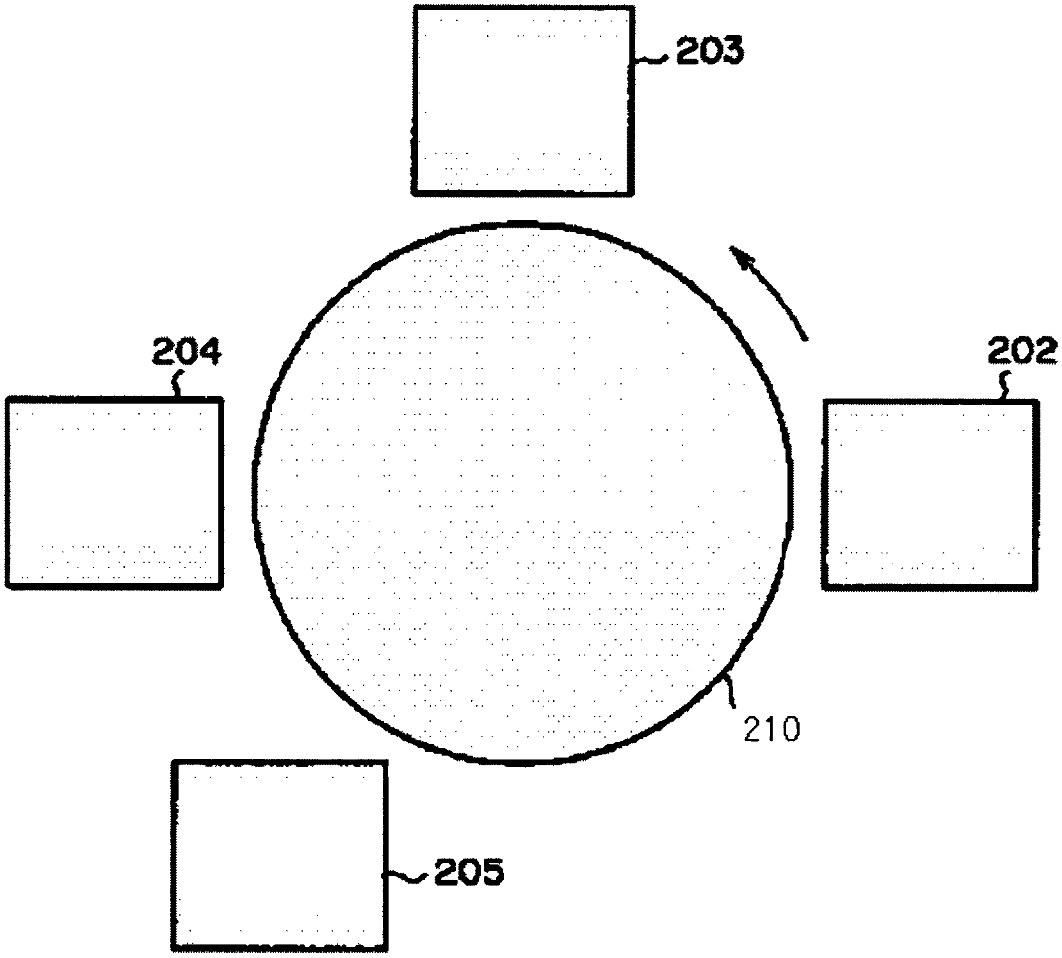
FIG. 18 schematically shows an example of an apparatus used for producing an inkjet head by a method of producing an inkjet head.

FIG. 18 schematically shows an apparatus used in producing an inkjet head by the method for producing the inkjet head used in the present invention. This apparatus implements the so-called "metamode process" developed by Optical Coating Laboratory Inc. (OCLI, USA), and used for producing antireflective films and contamination-preventing films for displays or the like. As shown in FIG. 18, a Si sputter 202, an $O_2$ ion gun 203, a Nb sputter 204, and an Optool deposition unit 205 are disposed as stations in four locations around a drum 210, and the entire configuration is disposed in an evacuated chamber. First, Si is sputtered with the Si sputter 202, and then $SiO_2$ is obtained by bombarding the Si with $O_2$ ions with the $O_2$ ion gun 203. Nb and Optool DSX are then appropriately vapor deposited with the Nb sputter 204 and Optool deposition unit 205. In the case of an antireflective film, vapor deposition is performed after Nb and $SiO_2$ are stacked to obtain the necessary number of layers of a predetermined thickness. In the case of the present invention, the function of antireflective film is not required. Therefore, Nb is not necessary, and $SiO_2$ and Optool DSX may be deposited by one layer each. With this apparatus, as described hereinabove, vapor deposition of Optool DSX can be implemented inside the vacuum chamber directly after the $SiO_2$ thin-film layer 122 has been deposited.

(Critical Surface Tension)

The ink repellent layer has a critical surface tension of preferably 5 mN/m to 40 mN/m, and more preferably 5 mN/m to 30 mN/m. When the critical surface tension exceeds 30 mN/m, a phenomenon by which the nozzle plate is over-wetted with the ink in long-term use occurs. As a result, curving of ink discharge trajectory or abnormal formation of ink droplets sometimes occurs in repeated printing. On the other hand, when the critical surface tension exceeds 40 mN/m, the over-wetting of the nozzle plate occurs from the beginning, whereby curving of ink discharge trajectory or abnormal formation of ink droplets sometimes occurs from the beginning.

The ink repellent material shown in Table 2 is coated on an aluminum board and dried by heating to produce a nozzle plate having an ink repellent layer. Results obtained in measuring the critical surface tension of the ink repellent layer are shown in Table 2.

Here, the critical surface tension can be found by a Zisman method. Thus, a liquid having a known surface tension is dropped on the ink repellent layer, a contact angle θ is measured, and a line descending to the right (Zisman Plot) is obtained by plotting the surface tension of the liquid against the x axis and cos θ against the y axis.

The surface tension at a point where the line is Y=1 (θ=0) can be calculated as the critical surface tension γc. Examples of other methods suitable for finding the critical surface tension include a Fowkes method, an Owens and Wendt method, and a Van Oss method.

Similarly to the above-described method for producing an inkjet head, an inkjet head is produced by using the nozzle plate having an ink repellent layer. The below-described cyan ink of Production Example 5 is sprayed thereonto. The jetting process of the ink is videotaped and observed. For all the nozzle plates used, accurate atomization and excellent discharge stability are confirmed.

TABLE 2

| Manufacturer | Product Name | Critical surface tension | Discharge stability |
|---|---|---|---|
| Dow Corning Toray Co., Ltd. | SR2411 | 21.6 mN/m | Good |
| Shin-Etsu Chemical Co., Ltd. | KBM7803 | 16.9 mN/m | Good |
| Shin-Etsu Chemical Co., Ltd. | KP801M | 6.6 mN/m | Good |

(Ink Record)

An ink record is recorded by means of the inkjet recording method of the present invention. The ink record has an image formed on a recording medium of the ink media set using the ink of the ink media set, according to the present invention.

The ink records have a high image quality with less ink bleed and excel in stability over time, and thus the ink records may be suitably used for various purposes as documents on which various printing and/or images are recorded.

EXAMPLES

Hereinafter, Examples of the present invention will be described, which however shall not be construed as limiting the scope of the present invention. All parts are by mass unless indicated otherwise.

An inkjet head was prepared using a nozzle plate having an ink repellent layer in the same manner as the method for producing an inkjet head set forth above. The cyan ink of Production Example 1 was used in the inkjet head to jet the ink. The process of jetting the ink was recorded using a video set, and the video recording status was observed. It was confirmed that the ink droplets were normally formed and the discharge stability was excellent with the use of any of the prepared nozzle plates, respectively.

Preparation of Pigment Ink

Production Example 1

Cyan

—Preparation of Fine Particle Dispersion Containing Copper Phthalocyanine Pigment—

An inside of a 1 L flask equipped with a mechanical stirrer, a thermometer, a nitrogen gas introducing tube, a reflux tube and a drop funnel was sufficiently replaced with nitrogen gas, then 11.2 g of styrene, 2.8 g of acrylic acid, 12.0 g of lauryl methacrylate, 4.0 g of polyethylene glycol methacrylate, 4.0 g of styrene macromer (trade name: AS-6 manufactured by TOAGOSEI CO., LTD.) and 0.4 g of mercaptoethanol were loaded therein, and the temperature was raised to 65° C. Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6 manufactured by TOAGOSEI CO., LTD.), 3.6 g of mercaptoethanol, 2.4 g of azobismethyl valeronitrile and 18 g of methyl ethyl ketone was dripped over 2.5 hours in the flask.

After dripping, a mixed solution of 0.8 g of azobismethyl valeronitrile and 18 g of methyl ethyl ketone was dripped over 0.5 hours in the flask. After maturing at 65° C. for one hour, 0.8 g of azobismethyl valeronitrile was added, and the mixture was further matured for one hour. After the termination of the reaction, 364 g of methyl ethyl ketone was added in the flask to prepare 800 g of a polymer solution having a concentration of 50% by mass. A part of the polymer solution was then dried and measured by gel permeation chromatography (standard: polystyrene, solvent: tetrahydrofuran). The mass-average molecular weight (Mw) was 15,000.

Then, 28 g of the obtained polymer solution, 26 g of copper phthalocyanine pigment, 13.6 g of an aqueous solution of potassium hydroxide with a concentration of 1 mol/L, 20 g of methyl ethyl ketone, and 30 g of ion-exchanged water were thoroughly stirred. A total of 20 cycles of kneading were then performed using a three-roll mill (trade name: NR-84A, manufactured by Noritake Company). The obtained paste was added to 200 g of ion-exchanged water, and the mixture was sufficiently stirred. Thereafter, the mixture was treated with an evaporator so as to evaporate methyl ethyl ketone and water, to thereby obtain 160 g of blue colored dispersion of fine polymer particles having solid content of 20.0% by mass.

The average particle diameter (D50%) of the obtained fine polymer particles which was measured with a particle size distribution measurement device (Microtrack UPA, manufactured by Nikkiso Co. Ltd.) was 93 nm.

Production Example 2

Magenta

—Preparation of Fine Particle Dispersion Containing Dimethylquinacridone Pigment—

A red purple colored dispersion of fine polymer particles was prepared in the same manner as in Production Example 1, except that a copper phthalocyanine pigment in Production Example 1 was replaced with Pigment Red 122.

The average particle diameter (D50%) of the obtained fine polymer particles which was measured with a particle size distribution measurement device (Microtrack UPA, manufactured by Nikkiso Co. Ltd.) was 127 nm.

Production Example 3

Yellow

—Preparation of Fine Polymer Particle Dispersion Containing Monoazo Yellow Pigment—

A yellow dispersion of fine polymer particle was prepared in the same manner as in Production Example 1, except that the copper phthalocyanine pigment in Production Example 1 was replaced with Pigment Yellow 74.

The average particle diameter (D50%) of the obtained fine polymer particles which was measured with a particle size distribution measurement device (Microtrack UPA, manufactured by Nikkiso Co. Ltd.) was 76 nm.

Production Example 4

Black

—Preparation of Carbon Black Dispersion—

A total of 300 g of commercial acidic carbon black having pH 2.5 (trade name: Monarch 1300, manufactured by Cabot Corporation) was mixed thoroughly in 1,000 mL of water. Then, 450 g of sodium hypochlorite (effective chlorine concentration: 12%) was added dropwise and stirred for 8 hours at 100° C. to 105° C. In this liquid, 100 g of sodium hypochlorite (effective chlorine concentration: 12%) was then added, and dispersed for 3 hours in a horizontal disperser. The obtained slurry was diluted tenfold with water, and then pH was adjusted with lithium hydroxide, and the slurry was desalted and concentrated with an ultrafiltration membrane to an electric conductivity of 0.2 mS/cm to obtain a carbon black dispersion having a pigment concentration of 15%. Subsequently, coarse particles were removed by centrifuging, and filtrated through a 1 μm Nylon filter to obtain a carbon black dispersion.

The average particle diameter (D50%) of the obtained fine polymer particles which was measured with a particle size distribution meter (Microtrack UPA, manufactured by Nikkiso Co.) was 95 nm.

Next, ink compositions were prepared by using the dispersions of fine polymer particles obtained by Production Examples 1 to 4 and carbon black dispersion.

Production Example 5

—Preparation of Cyan Ink Composition 1—

A total of 20.0 mass % of dispersion of fine polymer particles containing copper phthalocyanine pigment of Production Example 1, 23.0 mass % of 3-methyl-1,3-butanediol, 8.0 mass % of glycerin, 2.0 mass % of 2-ethyl-1,3-hexanediol, 2.5 mass % of FS-300 (manufactured by DuPont), 0.2 mass % of Proxel LV (manufactured by Avecia Co.), 0.5 mass % of 2-amino-2-ethyl-1,3-propanediol, and an appropriate amount of ion-exchanged water were added to obtain 100 mass %. Filtration was performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C. The viscosity was measured at 25° C. with a viscometer (rotary viscometer R500, manufactured by Toki Sangyo Co., Ltd.).

Production Example 6

—Preparation of Magenta Ink Composition 1—

A total of 20.0 mass % of the dispersion of fine polymer particles containing dimethylquinacridone pigment of Production Example 2, 22.5 mass % of 3-methyl-1,3-butanediol, 9.0 mass % of glycerin, 2.0 mass % of 2-ethyl-1,3-hexanediol, 2.5 mass % of FS-300 (manufactured by DuPont), 0.2 mass % of Proxel LV (manufactured by Avecia Co.), 0.5 mass % of 2-amino-2-ethyl-1,3-propanediol, and an appropriate amount of ion-exchanged water were added to obtain 100 mass %. Filtration was then performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C.

Production Example 7

—Preparation of Yellow Ink Composition 1—

A total of 20.0 mass % of the dispersion of fine polymer particles containing monoazo yellow pigment of Production Example 3, 24.5 mass % of 3-methyl-1,3-butanediol, 8.0 mass % of glycerin, 2.0 mass % of 2-ethyl-1,3-hexanediol, 2.5 mass % of FS-300 (manufactured by DuPont), 0.2 mass % of Proxel LV (manufactured by Avecia Co.), 0.5 mass % of 2-amino-2-ethyl-1,3-propanediol, and an appropriate amount of ion-exchanged water were added to obtain 100 mass %. Filtration was then performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C.

Production Example 8

—Preparation of Black Ink Composition 1—

A total of 20.0 mass % of carbon black dispersion of Production Example 4, 22.5 mass % of 3-methyl-1,3-butanediol, 7.5 mass % of glycerin, 2.0 mass % of 2-pyrrolidone, 2.0 mass % of 2-ethyl-1,3-hexanediol, 2.0 mass % of $R—(OCH_2CH_2)_nOH$ (where R represents an alkyl group having 12 carbon atoms; n=9), 0.2 mass % of Proxel LV (manufactured by Avecia Co.), 0.5 mass % of 2-amino-2-ethyl-1,3-propanediol, and an appropriate amount of ion-exchange water were added to obtain 100 mass %. Filtration was then performed with a membrane filter having an average pore diameter of 0.8 μm. The solid content was then adjusted to 12 mass % with ion-exchanged water. Thus, an ink composition was prepared. The obtained ink composition had a viscosity of 9 mPa·s and a surface tension of 25 mN/m at a temperature of 25° C.

Preparation of Dye Ink

Production Example 9

The below-described components were mixed, stirred thoroughly to be dissolved, and pressure filtered through a Floropore filter (trade name, manufactured by Sumitomo Electric Industries, Ltd.) having a pore size of 0.45 μm to prepare a dye ink set.

The dye ink composition was as follows:

| Dye ink composition |
|---|
| Dyes |
| Yellow: C.I. Direct Yellow 86<br>Cyan: C.I. Direct Blue 199<br>Magenta: C.I. Acid Red 285<br>Black: C.I. Direct Black 154 |

-continued

| Dye ink composition | |
|---|---|
| Formulation | |
| Dye | 4 parts |
| Glycerin | 7 parts |
| Thiodiglycol | 7 parts |
| Urea | 7 parts |
| Acetylene glycol | 1.5 parts |
| Water | 73.5 parts |

The obtained ink composition had a viscosity of 4 mPa·s and a surface tension of about 35 dyne/cm at a temperature of 25° C.

<Production of Base Paper>

| -Preparation of Support 1- | |
|---|---|
| LBKP | 80 parts |
| NBKP | 20 parts |
| Light calcium carbonate (trade name: TP-121, manufactured by Okutama Kogyo Kabushiki Kaisha) | 10 parts |
| Aluminum sulfate | 1.0 part |
| Amphoteric starch (trade name: Cato 3210, manufactured by Japan NSC Co., Ltd.) | 1.0 part |
| Neutral rosin sizing agent (trade name: NeuSize M-10, manufactured by Harima Kasei Kabushiki Kaisha) | 0.3 parts |
| Yield improving agent (trade name: NR-11LS, manufactured by HYMO Co., Ltd.) | 0.02 parts |

The 0.3 mass % of slurry of the above-described mixture was processed in a fourdrinier former and finish-processed in machine calender to prepare a support 1 having a basis weight of 79 g/m$^2$. In the size pressing step of the papermaking process, an aqueous solution of oxidized starch was applied such that the amount of adhered solid contents was 1.0 g/m$^2$ for one surface.

Production Example 11

Preparation of Pretreatment Liquid

A pretreatment liquid was prepared by mixing the below described components, dissolving by thoroughly stirring, and then subjecting to pressure filtration by using a Floropore filter (trade name, manufactured by Sumitomo Electric Industries, Ltd.) having a pore size of 0.45 μm.

| Formulation | |
|---|---|
| Polyoxyalkylene alkyl ether | 1 part |
| High-purity water | 79 parts |
| 1,3-butylene glycol | 20 parts |

Example 1

For the prepared support 1, a coating solution was prepared by adding water to the following formulation so as to have a solid content concentration of 60%.

| | |
|---|---|
| Kaolin | 60 parts |
| Light calcium carbonate | 30 parts |
| Gel type silica | 10 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.) | 0.5 parts |

The materials used in this Example are specifically explained as follows (Hereinafter, these are the same as in other Examples and Comparative Examples, unless otherwise indicated.):

Kaolin: primary kaolin, HG-90 (manufactured by Huber Corporation, average particle diameter of 0.9 μm or less);

Calcined kaolin: ANSILEX 90 (manufactured by Engelhard Corporation);

Light calcium carbonate: TAMAPEARL TP-222H (manufactured by Okutama Kogyo Kabushiki Kaisha, volume average particle size: 0.8 μm);

Heavy calcium carbonate: Eskaron #2000 (manufactured by Sankyo Seifun CO., LTD., average particle diameter: 1.2 μm);

Gel type silica: Nipgel AZ-200 (manufactured by Nihon silica Kogyo Co., Ltd, average particle diameter: 2.7 μm); and Polyacrylic acid dispersant; AronT-50 (manufactured by TOAGOSEI CO., LTD.).

This coating solution was applied on both surfaces of the base paper with an air knife coater so as to have a thickness of 10 μm for one surface, and dried by hot-air, and then subjected to super calender treatment at a linear pressure of 150 kg/cm to 250 kg/cm, thereby obtaining a recording medium 1 of the present invention.

An ink set 1 of black, yellow, magenta and cyan which consists of the ink compositions prepared in the Production Examples 1 to 8 was prepared. Images were printed on the recording medium 1 with the ink set 1 at an image resolution of 600 dpi using a 300 dpi drop-on-demand printer prototype having nozzles with a nozzle resolution of 384. The large ink drop size was 20 pl, medium ink drop size was 10 pl, and small ink drop size was 2 pl. The total amount of ink for a secondary color was limited to 140%. Solid images and characters were printed so that a total amount of ink for 300 dots square did not exceed 15 g/m$^2$ at the time of printing the solid images. A printing pattern for evaluation was produced using Word2000 (9.0.6926 SP-3) manufactured by Microsoft Corporation.

Images for evaluating glossiness and beading was prepared by drawing seven 5 cm squares (for seven colors) adjacent to each other using a graphic drawing tool of Word2000 with setting line and fill by each color of Y, M, C, K, R, G and B in the user setting.

The conditions of fill and line were as follows:
Yellow (Red 0 Green 255 Blue 255);
Cyan (Red 255 Green 255 Blue 0);
Magenta (Red 255 Green 0 Blue 255);
Red (Red 255 Green 0 Blue 0);
Green (Red 0 Green 255 Blue 0);
Blue (Red 0 Green 0 Blue 255); and
Black (Red 0 Green 0 Blue 0).

As an image for evaluating bleeding, a pattern was formed in the following manner that solid images of 2 cm squares of respective colors were formed in the same manner as images for evaluating glossiness, and a black colored character "A" in a size of 15 points was drawn in each of the 2 cm squares.

The image reliability of the obtained images were evaluated. The results are shown in Table 3.

As for evaluating banding in an image, a gray rectangle in a size of 18 cm×26 cm was drawn using Word2000 and printed, and visually observed whether streaks occurred. The fill condition was Red 128 Green 128 Blue 128. The medium evaluated as D was not suitable one.

The banding was evaluated on the basis of the following evaluation criteria.

<Banding>

A: Uniform image. No defect was observed.

B: Band-like unevenness was confirmed by careful observation, but there was practically no problem.

C: Band-like unevenness was confirmed and possibly of a problem.

D: Unacceptable band-like uneven density was confirmed and of a problem.

The dot diameter was measured in the following manner that cyan ink drop in a size of 21 pl was discharged on a medium, and its diameter was measured by Dot Analyzer DA5000 (manufactured by Oji Scientific Instruments).

Example 2

Printing was performed in the same manner as in Example 1, except that the formulation of the coating solution was replaced with the following formulation:

| | |
|---|---|
| Kaolin | 40 parts |
| Calcined kaolin | 20 parts |
| Light calcium carbonate | 30 parts |
| Gel type silica | 10 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.). | 0.5 parts |

Example 3

Printing was performed in the same manner as in Example 1, except that the super calender treatment was not performed after coating and drying the solution.

Example 4

Printing was performed in the same manner as in Example 1, except that the super calender treatment was performed at a linear pressure of 50 kg/cm to 150 kg/cm after coating and drying the solution.

Example 5

Printing was performed in the same manner as in Example 1, except that the ink in Example 1 was replaced with the dye ink of Production Example 9.

Example 6

Printing was performed in the same manner as in Example 1, except that the formulation of the coating solution was replaced with the following formulation:

| | |
|---|---|
| Kaolin | 40 parts |
| Calcined kaolin | 20 parts |
| Light calcium carbonate | 30 parts |
| Gel type silica | 10 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.) | 0.5 parts |
| Cation polymer: diallyldimethyl quaternary ammonium hydrochloride (UNISENCE CP-103 manufactured by SENKA corporation). | 2.5 parts |

Comparative Example 1

Printing was performed in the same manner as in Example 1, except that the formulation of the coating solution was replaced with the following formulation:

| | |
|---|---|
| Kaolin | 80 parts |
| Light calcium carbonate | 20 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.) | 0.5 parts |

Comparative Example 2

Printing was performed in the same manner as in Example 1, except that the formulation of the coating solution was replaced with the following formulation:

| | |
|---|---|
| Kaolin | 20 parts |
| Light calcium carbonate | 70 parts |
| Heavy calcium carbonate | 10 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.). | 0.5 parts |

Comparative Example 3

Printing was performed in the same manner as in Example 1, except that the formulation of the coating solution was replaced with the following formulation:

| | |
|---|---|
| Kaolin | 60 parts |
| Light calcium carbonate | 30 parts |
| Silica | 10 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.). | 0.5 parts |

The silica used in Comparative Example 3 was gel type silica having small oil absorption and a large particle diameter, specifically, "NIPGEL BY-6A1" (manufactured by TOSOH SILICA CORPORATION, average particle diameter: 6 μm, specific surface area: 450 $m^2/g$).

Comparative Example 4

Printing was performed in the same manner as in Example 1, except that the formulation of the coating solution was replaced with the following formulation:

| | |
|---|---|
| Kaolin | 85 parts |
| Gel type silica | 5 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.). | 0.5 parts |

Comparative Example 5

Printing was performed in the same manner as in Example 1, except that the formulation of the coating solution was replaced with the following formulation:

| | |
|---|---|
| Kaolin | 25 parts |
| Light calcium carbonate | 30 parts |
| Wet process silica (TOKUSIL NR manufactured by TOKUYAMA Corp.) | 45 parts |
| Polyacrylic acid dispersant | 0.2 parts |
| Starch | 5 parts |
| SBR latex (L-2082 manufactured by Asahi Kasei Chemicals Corporation) | 13 parts |
| Water resistant additive (SPI-203 manufactured by Sumika Chemtex Co., Ltd.). | 0.5 parts |

Comparative Example 6

Printing was performed in the same manner as in Example 1, except that the formulation of the coating solution was replaced with the following formulation:

| | |
|---|---|
| Kaolin | 40 parts |
| Light calcium carbonate | 30 parts |
| Gel type silica | 25 parts |
| Polyacrylic acid dispersant | 0.2 parts |
| Starch | 5 parts |
| SBR latex (L-2082 manufactured by Asahi Kasei Chemicals Corporation) | 13 parts |

-continued

| | |
|---|---|
| Water resistant additive (SPI-203 manufactured by Sumika Chemtex Co., Ltd.). | 0.5 parts |

(Evaluation Criteria and Measurement Method)

<Beading>

The degree of uneven density in a solid part was visually observed and evaluated. Those inferior to a grade sample was evaluated as inadequate. Specifically, the beading was evaluated on the basis of the following evaluation criteria.

A: Density in solid part was uniform and uneven density was not confirmed.

B: Uneven density was confirmed by careful observation, but there was practically no problem.

C: Uneven density was confirmed and possibly of a problem.

D: Uneven density apparently occurred and unacceptable.

<Bleeding>

The degree of bleeding of characters was visually observed and evaluated. Those inferior to a grade sample was evaluated as inadequate. Specifically, the bleeding was evaluated on the basis of the following evaluation criteria.

A: No bleeding in thin lines was confirmed at all.

B: Bleeding in thin lines was confirmed by careful observation, but there was practically no problem.

C: Bleeding in thin lines was confirmed and possibly of a problem.

D: Bleeding in characters was severe and they were hard to be identified.

<Drying Property>

A blue solid image in a size of 1.5 cm×1.5 cm was printed, and a filter paper was placed on the printed image. The time when ink was not transferred onto the filter paper was defined as a drying completion time.

<Glossiness>

The background gloss at 60 degrees solid chart gloss at 60 degrees were measured using micro-gloss Glossimeter (manufactured by BYK-Gardner). The specular glossiness at 75 degrees to a normal line of paper surface was measured in accordance with JIS P8142.

<Image Density>

Image Density was measured by Color Reflection Densitometer (manufactured by X-Rite).

<Printability>

By using a RI (Rotay Lnk) printability tester (manufactured by IHI Machinery and Furnace Co., Ltd.), a solid image was formed with 0.8 cc of a cyan ink, High Unity Neo SOY (manufactured by TOYO INK MFG. CO., LTD.) in on a coated paper, and left to stand for 8 hours at 23° C. and RH65%. Next, the printed solid image in a size of 5 cm×5 cm was evaluated by touching with fingers on the basis of the following evaluation criteria.

A: No or little amount of ink was transferred on a finger.

B: Slightly large amount of ink was transferred on a finger.

C: Extremely large amount of ink was transferred on a finger.

TABLE 3

| | | absorption (ml/100 CC) | Ex. 1 | Ex. 2 | Ex. 3 | Ex. 4 | Ex. 5 | Ex. 6 (containing cation) | Comp. Ex. 1 |
|---|---|---|---|---|---|---|---|---|---|
| Formulation | kaolin | 10 | 60 | 40 | 40 | 40 | 40 | 60 | 80 |
| | calcined kaolin | 30 | — | 20 | 20 | 20 | 20 | — | — |
| | light calcium carbonate | 125 | 30 | 30 | 30 | 30 | 30 | 30 | 20 |
| | heavy calcium carbonate | 40 | — | — | — | — | — | — | — |

TABLE 3-continued

| | | | | | | | | | |
|---|---|---|---|---|---|---|---|---|---|
| | silica | 240 | — | — | — | — | — | — | — |
| | silica (wet process silica) | 180 | — | — | — | — | — | — | — |
| | Gel type silica | 330 | 10 | 10 | 10 | 10 | 10 | 10 | — |
| average oil absorption | | | 76.5 | 80.5 | 80.5 | 80.5 | 80.5 | 76.5 | 33 |
| calender treatment (linear pressure kg/cm) | | | 150-250 | 150-250 | 0 | 50-150 | 150-250 | 150-250 | 150-250 |
| ink | | | pigment | pigment | pigment | pigment | dye | pigment | pigment |
| beading | | | A | A | A | A | A | A | D |
| bleeding | | | B | B | B | B | D | B | B |
| drying property (sec) | | | 18 | 18 | 15 | 17 | 18 | 18 | 60 |
| gloss | background (60°) | | 18 | 18 | 4 | 10 | 18 | 18 | 20 |
| | background (75°) | | 70 | 65 | 8 | 35 | 65 | 70 | 72 |
| | image (60°) | | 38 | 38 | 20 | 28 | 18 | 38 | 40 |
| image density | K | | 1.8 | 1.8 | 1.7 | 1.8 | 1.3 | 1.8 | 1.8 |
| | C | | 1.5 | 1.5 | 1.4 | 1.5 | 1.1 | 1.5 | 1.6 |
| | M | | 1.4 | 1.4 | 1.3 | 1.4 | 1 | 1.4 | 1.4 |
| | Y | | 1.2 | 1.2 | 1.2 | 1.2 | 0.9 | 1.2 | 1.2 |
| dot diameter | | | 65 | 65 | 67 | 65 | 70 | 65 | 60.7 |
| banding | | | B | B | A | B | B | B | D |
| printability | | | A | A | A | A | A | B | A |

| | | absorption (ml/100 CC) | Comp. Ex. 2 | Comp. Ex. 3 | Comp. Ex. 4 | Comp. Ex. 5 (TOKUSIL NR) | Comp. Ex. 6 (120 or more) |
|---|---|---|---|---|---|---|---|
| Formulation | kaolin | 10 | 20 | 60 | 85 | 25 | 40 |
| | calcined kaolin | 30 | — | — | — | — | — |
| | light calcium carbonate | 125 | 70 | 30 | — | 30 | 30 |
| | heavy calcium carbonate | 40 | 10 | — | — | — | — |
| | silica | 240 | — | 10 | — | — | — |
| | silica (wet process silica) | 180 | — | — | — | 45 | — |
| | Gel type silica | 330 | — | — | 15 | — | 25 |
| average oil absorption | | | 93.5 | 67.5 | 58 | 121 | 130.5 |
| calender treatment (linear pressure kg/cm) | | | 150-250 | 150-250 | 150-250 | 150-250 | 150-250 |
| ink | | | pigment | pigment | pigment | pigment | pigment |
| beading | | | D | B | A | B | A |
| bleeding | | | B | B | B | B | B |
| drying property (sec) | | | 60 | 30 | 25 | 13 | 15 |
| gloss | background (60°) | | 7.8 | 12 | 20 | 6 | 3 |
| | background (75°) | | 40 | 50 | 45 | 12 | 10 |
| | image (60°) | | 14.3 | 18 | 40 | 6 | 4 |
| image density | K | | 1.7 | 1.8 | 1.8 | 1.6 | 1.5 |
| | C | | 1.6 | 1.6 | 1.6 | 1.2 | 1.1 |
| | M | | 1.3 | 1.3 | 1.4 | 1.1 | 1.1 |
| | Y | | 1.2 | 1.2 | 1.2 | 1.1 | 1 |
| dot diameter | | | 61 | 66.9 | 61 | 60 | 59 |
| banding | | | D | B | D | D | D |
| printability | | | A | A | A | B | B |

INDUSTRIAL APPLICABILITY

With the recording method of the present invention, a glossy recorded image of excellent printing quality that is free from blurring, feathering, and bleeding at the peripheral portion of characters and images and has the so-called "clear-cut edges" can be provided at a high speed by using recording media having texture close to paper for general commercial printing, and the present invention can be advantageously applied to an ink record, inkjet recording apparatus, and inkjet recording method. Further, the obtained print excels in resistance of images to rubbing and has excellent handling ability after printing.

The inkjet recording method of the present invention is applicable to various types of recording by inkjet recording, and in particular advantageously applicable, for example, to printers, facsimile devices, copiers, and printer/fax/copier multipurpose machines for inkjet recording.

The invention claimed is:

1. An inkjet medium comprising:

a support mainly comprising cellulose pulp; and an outermost coat layer comprising a pigment and an adhesive, the coat layer formed on at least one surface of the support, wherein the pigment comprises at least light calcium carbonate, kaolin and gel type silica and has an average oil absorption of 70 ml/100 g to 120 ml/100 g, and wherein the amount of the gel type silica in the coat layer relative to the total pigment amount in the coat layer is 10 mass % or less.

2. The inkjet medium according to claim 1, wherein the adhesive comprises at least SBR latex and any one of starch and cationized starch.

3. The inkjet medium according to claim 1, wherein the amount of cationic resin in the coat layer is 2 mass % or less.

4. The inkjet medium according to claim 1, wherein the coat layer is subjected to calender treatment so as to have a background gloss of 5% to 75% based on 75-degree specular glossiness measured in accordance with JIS P8142.

5. An article of manufacture comprising an ink and an inkjet medium, said ink comprising:

colorant particles;

glycerin;

a water soluble organic solvent;

water;

a surfactant; and a resin emulsion, wherein the ink has an surface tension of 15 mN/m to 30 mN/m and is located on a coat layer of an inkjet medium that comprises:

a support mainly comprising cellulose pulp; and said coat layer, wherein said coat layer comprises a pigment and an adhesive and is formed on at least one surface of the support, the pigment comprising at least light calcium carbonate, kaolin and gel type silica and having an average oil absorption of 70 ml/100 g to 120 ml/100 g, and wherein the amount of the gel type silica in the coat layer relative to the total pigment amount in the coat layer is 10 mass % or less.

6. The article according to claim 5, wherein the ink comprises a self-dispersible pigment as the colorant, and the self-dispersible pigment has an average particle diameter of 0.01 μm to 0.16 μm.

7. An inkjet recording method comprising:

printing an ink image on the inkjet medium according to claim 1, wherein the ink comprises:

colorant particles;

glycerin;

a water soluble organic solvent;

water;

a surfactant; and a resin emulsion, and wherein the ink has an surface tension of 15 mN/m to 30 mN/m, and wherein the maximum amount of ink adhesion is 20 $g/m^2$ or less.

8. The inkjet recording method according to claim 7, comprising:

jetting said ink from an inkjetting unit so as to form said ink image on the inkjet medium by applying a stimulus.

9. The inkjet recording method according to claim 8, wherein the stimulus is at least one selected from heat, pressure, vibration and light.

10. The inkjet medium according to claim 1, wherein the kaolin has an average particle diameter of 2 μm or less, and wherein the amount of kaolin in said pigment is 60 parts by mass or more in 100 parts by mass of a total amount of pigment in the coat layer.

11. The inkjet medium according to claim 10, wherein the light calcium carbonate has an average particle diameter of 3 μm or less, and wherein the amount of the light calcium carbonate in the total pigment is 20 mass % or more.

12. The article according to claim 5, wherein the kaolin has an average particle diameter of 2 μm or less, and wherein the amount of kaolin in said pigment is 60 parts by mass or more in 100 parts by mass of a total amount of pigment in the coat layer.

13. The article according to claim 12, wherein the light calcium carbonate has an average particle diameter of 3 μm or less, and wherein the amount of the light calcium carbonate in the total pigment is 20 mass % or more.

* * * * *